(12) United States Patent
Negishi et al.

(10) Patent No.: US 10,486,614 B2
(45) Date of Patent: Nov. 26, 2019

(54) SPEAKER SYSTEM FOR MOBILE OBJECT

(71) Applicants: PIONEER CORPORATION, Tokyo (JP); Tohoku Pioneer Corporation, Yamagata (JP)

(72) Inventors: Takayuki Negishi, Yamagata (JP); Yasumi Umetsu, Yamagata (JP); Toru Nakamura, Yamagata (JP); Tatsuya Suzuki, Yamagata (JP)

(73) Assignees: PIONEER CORPORATION, Tokyo (JP); TOHOKU PIONEER CORPORATION, Yamagata (JP)

( * ) Notice: Subject to any disclaimer, the term of this patent is extended or adjusted under 35 U.S.C. 154(b) by 0 days.

(21) Appl. No.: 15/755,438

(22) PCT Filed: Aug. 15, 2016

(86) PCT No.: PCT/JP2016/073857
§ 371 (c)(1),
(2) Date: Feb. 26, 2018

(87) PCT Pub. No.: WO2017/038442
PCT Pub. Date: Mar. 9, 2017

(65) Prior Publication Data
US 2018/0251079 A1  Sep. 6, 2018

(30) Foreign Application Priority Data

Aug. 28, 2015 (JP) ................................. 2015-169700
Aug. 28, 2015 (WO) .................. PCT/JP2015/074530
Aug. 28, 2015 (WO) .................. PCT/JP2015/074531

(51) Int. Cl.
*H04R 1/02* (2006.01)
*B60R 11/02* (2006.01)
(Continued)

(52) U.S. Cl.
CPC .......... *B60R 11/0217* (2013.01); *H04R 1/026* (2013.01); *H04R 5/02* (2013.01);
(Continued)

(58) Field of Classification Search
CPC ..... B06R 11/0217; H04R 1/025; H04R 1/026; H04R 1/345; H04R 1/403; H04R 1/2857; H04R 5/03; H04R 2499/13
See application file for complete search history.

(56) References Cited

U.S. PATENT DOCUMENTS

| | | | | |
|---|---|---|---|---|
| 5,821,471 | A * | 10/1998 | McCuller | H04M 1/035 181/156 |
| 2004/0141625 | A1 * | 7/2004 | Leipold | B60R 11/0217 381/86 |
| 2009/0110210 | A1 * | 4/2009 | Ludwig | B60R 11/0217 381/86 |

FOREIGN PATENT DOCUMENTS

| | | |
|---|---|---|
| JP | 63-090993 | 4/1988 |
| JP | 63-97990 | 6/1988 |

(Continued)

OTHER PUBLICATIONS

International Search Report, PCT/JP2016/073857, dated Oct. 4, 2016.

*Primary Examiner* — Brian Ensey
(74) *Attorney, Agent, or Firm* — Young & Thompson

(57) ABSTRACT

A speaker system for a mobile object capable of being easily mounted on the mobile object is provided. The speaker system includes a speaker unit, enclosure accommodating the speaker unit, and a tubular member one end of which is connected to an internal space of the enclosure, and the speaker unit and the enclosure are built in a back door thereof. A free space in a vehicle is utilized effectively, thereby mounting the speaker system for the mobile object in the vehicle easily.

9 Claims, 20 Drawing Sheets

(51) Int. Cl.
  *H04R 5/02* (2006.01)
  *H04R 1/28* (2006.01)
  *H04R 1/34* (2006.01)
  *H04R 1/40* (2006.01)

(52) U.S. Cl.
  CPC ............ *H04R 1/025* (2013.01); *H04R 1/2857* (2013.01); *H04R 1/345* (2013.01); *H04R 1/403* (2013.01); *H04R 2499/13* (2013.01)

(56) References Cited

FOREIGN PATENT DOCUMENTS

| JP | 01-143595 | 10/1989 |
|----|-----------|---------|
| JP | 04-110100 | 9/1992  |
| JP | 07-267003 | 10/1995 |

* cited by examiner

1

SPEAKER SYSTEM FOR MOBILE OBJECT

TECHNICAL FIELD

The present invention relates to a speaker system for a mobile object.

BACKGROUND ART

There is conventionally proposed an on-vehicle speaker device (a speaker system for a mobile object) which is placed in an instrument panel of a vehicle and also utilizes sound emitted from the back side (for example, refer to Patent Literature 1). In a conventional on-vehicle speaker device described in Patent Literature 1, a speaker is installed in an instrument panel with its front side set at an upper surface of the instrument panel and is accommodated in a cylindrical acoustic tube (a tubular member). Further, the speaker device is configured such that a component of a low sound range among the sounds generated at the back side of the speaker resonates in the acoustic tube and is emitted from a lower surface of the instrument panel.

CITATION LIST

Patent Literature

[Patent Document 1]: Japanese Unexamined Utility Model Application Publication No. H1-143595

SUMMARY OF INVENTION

Technical Problem

However, other than the speaker device, meters, an air conditioner and the like are accommodated in the instrument panel of the vehicle, and also electric wires to supply electricity to these devices are wired, thus a space to place the speaker device is not easily secured and there was a case where it was difficult to mount the on-vehicle speaker device described in Patent Literature 1.

Therefore, an example of the problem in the present invention is to provide a speaker system for a mobile object which is capable of being mounted easily in a mobile object.

Solution to Problem

In order to solve the problem and to achieve the object, a speaker system for a mobile object of the present invention includes a speaker unit emitting sound from a front side toward a box-shaped space formed by a mobile object, an accommodating unit accommodating a back side of the speaker unit, and a tubular member having one end communicating with an internal space of the accommodating unit, and the speaker unit and the accommodating unit are built in a door body of the mobile object, and a part of the tubular member is extending toward at least one of a plurality of surfaces surrounding the space, inside the door body.

DESCRIPTION OF EMBODIMENTS

Figure 1:
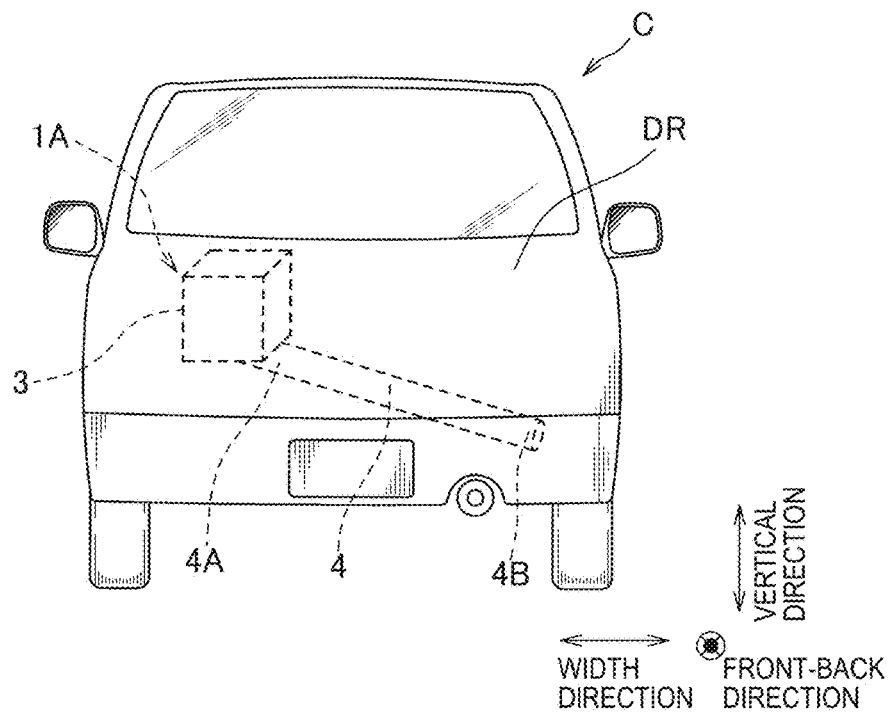
FIG. 1 is a rear view illustrating a mobile object installed with a speaker system for a mobile object according to Example 1 of the present invention.

An embodiment of the present invention will be described below. A speaker system for a mobile object according to the embodiment of the present invention includes a speaker unit emitting sound from a front side toward a box-shaped space formed by the mobile object, an accommodating unit accommodating a back side of the speaker unit, and a tubular member having one end connected to an internal space of the accommodating unit. The speaker unit and the accommodating unit are built in a door body of the mobile object, and inside the door body, a part of the tubular member is extending toward at least one of a plurality of surfaces surrounding the space. Here, the mobile object forming the box-shaped space has plural surfaces, for example, in a travelling direction, a front surface, a rear surface, a left side, a right side, a lower surface (a bottom surface), and an upper surface (a top surface).

The speaker unit and the accommodating unit are placed in the door body, thereby mounting the speaker system for the mobile object in the mobile object easily, utilizing a free space in the mobile object effectively. Further, since the one end of the tubular member is connected to the internal space of the accommodating unit (a space to accommodate the speaker unit), a component of a low sound range corresponding to a length of the tubular member among sounds generated at the back side of the speaker unit resonates in the tubular member and is emitted from the other end. Even when the speaker unit and the accommodating unit are placed in a position where a low sound does not easily echo, since a part of the tubular member like this is extending on the inner side of the door body, it is possible to place the other end of the tubular member in a position where the low sound easily echoes and to improve the characteristics of the low sound.

The speaker unit and the accommodating unit are preferably placed in the door body which forms the rear surface of the box-shaped space. The accommodating unit and the tubular member include a space inside of them. Since the accommodating unit and the part of the tubular member are placed in the door body which forms the rear surface, it is possible to absorb an impact when the impact is applied to the mobile object in the rear (for example, when colliding with other mobile objects or structures) by the accommodating unit and the tubular member being compressed, and also it is possible to improve cushioning properties of the door body.

The accommodating unit is provided in a position deviated from a central part to one side of the mobile object in the width direction of the mobile object, and the other end of the tubular member preferably opens toward an intersection part at which the other side in the width direction of the mobile object and the lower surface in the mobile object intersect. According to this, it is possible to place the tubular member utilizing a dimension in the width direction of the door body forming the rear surface of the mobile object, and it is also possible to make the tubular member long.

The speaker unit and the accommodating unit are preferably placed in the door body forming the side of the box-shaped space. According to this, it is possible to absorb an impact when the impact is applied to the mobile object at the side by the accommodating unit and the tubular member being compressed and it is also possible to improve the cushioning properties of the door body.

The tubular member includes a first tubular part placed in the door body and a second tubular part placed in the inside of a portion of the mobile object opposed to the door body, and an opening of the first tubular part and an opening of the second tubular part are provided in a surface of the door body and a surface of the portion of the mobile object opposed to each other, respectively, and it is preferable that the opening of the first tubular part and the opening of the second tubular part are in positions opposed to each other. According to this, at the surface of the door body and the surface of the portion of the mobile object, openings formed opposed to each other overlap, and as a result, the opening of the first tubular part and the opening of the second tubular part become connected. The tubular parts are connected to each other, thereby providing the tubular member across two or more members. Therefore, it is possible to make the tubular member long, and along with that, it is also possible to place the other end in the location where the low sound easily echoes by placing the tubular member appropriately on the inner side of each member.

The other end of the tubular member is preferably opening toward the intersection part where at least two of a plurality of surfaces surrounding the space intersect. According to this, since the other end of the tubular member is opening toward the intersection part where at least two of the plurality of surfaces surrounding the space intersect, the low sound emitted from the other end is reflected on at least two of the surfaces and echoes easily in the space of the mobile object, and it is possible to improve the characteristics of sound pressure of the low sound range or the like of the speaker system for the mobile object. Further, the other end of the tubular member is preferably opening toward a corner where at least three of the plurality of surfaces intersect. According to this, the low sound emitted from the other end is reflected on at least three of the surfaces and echoes easily in the space of the mobile object, and it is possible to improve the acoustic characteristics such as the sound pressure of the low sound range of the speaker system for the mobile object even more.

It is preferable to further include at least two of the speaker devices, each of which includes the speaker unit, the accommodating unit, and the tubular member, in at least one of the speaker devices, the speaker unit and the accommodating unit are built in the door body of the mobile object, and the part of the tubular member extends toward at least one of the plurality of surfaces surrounding the space in the inner side of the door body, and that in the box-shaped space, the two speaker devices are provided at respective corners of the front side and the rear side in the travelling direction of the mobile object, or, of one side and the other side of the width direction.

According to this, since the speaker system for the mobile object includes at least two of the speaker devices and each of them are placed at two corners of the mobile object, it is possible to improve the sound pressure of the emitted sound from the entire speaker system for the mobile object and it is also possible to improve the acoustic characteristics even when a free space at each corner is small. Further, since the one end of the tubular member is connected to the internal space of the accommodating unit (a space to accommodate the speaker unit), a component of the low sound range corresponding to the length of the tubular member among sounds generated at the back side of the speaker unit resonates in the tubular member and is emitted from the other end. Since low sound echoes easily at a corner, and the low sound emitted from the other end of the tubular member echoes, thereby improving especially the acoustic characteristics of the low sound range. Note that the accommodating unit and the tubular member may be formed integrally.

It is preferable to operate the speaker unit of the speaker device placed in the front side and the speaker unit of the speaker device placed in the rear side with a predetermined time difference. According to this, it is possible to obtain the good acoustic characteristics by adjusting a location of a node of a standing wave formed in the space of the mobile object by the emitted sound of the two speaker units appropriately.

It is preferable that the other end of the tubular member of the speaker device placed in the front side is opening toward the intersection part in the front side where at least two of the plurality of the surfaces surrounding the space intersect, that the other end of the tubular member of the speaker device placed in the rear side is opening toward the intersection part in the rear side where the at least two of the plurality of surfaces surrounding the space intersect, and that a wavelength of the standing wave formed by a sound wave emitted from the other end of the tubular member of the front side and the rear side is the same as an interval of the intersection part in the front side and the intersection part in the rear side. According to this, the sound wave emitted from the other end of the tubular member in the front and the rear is reflected on the each intersection part, and the standing wave is formed between the intersection parts. Since the standing wave including the wavelength which is the same as the interval between the intersection parts is generated, it is possible to adjust the location of the node of the standing wave as described above, and it is also possible to improve acoustic characteristics of sound of a relatively long wavelength (that is, a low sound). On the other hand, in a case where the sound is emitted from the other end of the tubular member both in the front side and in the rear side without a time difference, since the node of the standing wave like this is formed in an intermediate position of the intersection parts, the node is sometimes located at a slightly rear position from a location of a head part of a seat in the front side in a case where the mobile object comprises the seat in the front side and a seat in the rear side, and the sound pressure decreases easily at the location of the head part of the seat in the front side. Therefore, when the node is moved further to the rear side by providing a predetermined time difference, it becomes possible to improve the acoustic characteristics of the low sound range for a passenger seating in the front seat.

Further, since the other end of the tubular member is opening toward the intersection part, the low sound emitted from the other end is reflected on at least two surfaces and echoes easily in the space of the mobile object and it is possible to improve the acoustic characteristics of the low sound range of the speaker system for the mobile object even more. Note that it is more preferable that the intersection part of the front side is a part where the front surface and at least one of the other surfaces intersect, and that the intersection part of the rear side is a part where the rear surface and at least one of the other surfaces intersect.

It is preferable that the tubular member of the speaker device placed in the rear side and the one side extends from the accommodating unit toward the other side, and that the tubular member of the speaker device placed in the rear side and the other side extends from the accommodating unit to the one side. According to this, it is possible to make the tubular member long and to make the sound of a relatively long wavelength resonate in the tubular member. Therefore, it is possible to improve the acoustic characteristics of the low sound even more.

The speaker unit placed in the front side may be provided on un upper surface of the instrument panel of the mobile object, and the other end of the tubular member of the front side may be opening toward the corner where the front surface, the lower surface, and the side of the plurality of surfaces in the travelling direction of the mobile object intersect at the lower part of the instrument panel. According to this, the speaker unit is provided in the instrument panel, and the sound is emitted from the front side on an upper surface of the instrument panel, thereby making the emitted sound reach the passenger more easily. Further, since that at the lower part of the instrument panel, the other end of the tubular member is opening toward the corner where the front surface, the lower surface, and the side of the mobile object intersect, the low sound emitted from the other end is reflected on at least three surfaces and echoes easily in the space of the mobile object, and it is possible to improve the acoustic characteristics of the sound pressure of the low sound range or the like of the speaker system for the mobile object even more.

The speaker unit placed in the rear side may be provided to emit the sound toward the upper surface of the mobile object, and the other end of the tubular member of the rear side may be opening toward the corner where the rear surface, the upper surface, and the side of the plurality of surfaces in the travelling direction of the mobile object intersect. Thereby, it is possible to reflect the sound emitted from the front side of the speaker and the other end of the tubular member on the upper surface or at the corner, and it is possible to improve the acoustic characteristics even more.

It is preferable that at least one of closed tubular members having one end connected to the internal space of the accommodating unit and along with that the other end closed is included. According to this, since the one end of the closed tubular member is connected to the accommodating unit accommodating the back side of the speaker unit, not only a capacity of the accommodating unit, but also a capacity of the closed tubular member can be utilized as a capacity in the back side of the speaker unit, and it is possible to downsize the accommodating unit while securing the capacity of the back side of the speaker unit. In this case, the closed tubular member has high flexibility in installation, thereby providing the closed tubular member in an appropriate free space on the mobile object. For example, the closed tubular member may be provided inside a pillar of a vehicle, or, the pillar itself may be utilized as a closed tubular member. Therefore, by installing the closed tubular member, the speaker system for the mobile object may be easily provided on the mobile object while securing the capacity in the back side of the speaker unit.

Further, since one end of the tubular member is connected to the internal space of the accommodating unit (a space to accommodate the speaker unit), the component of the low sound range corresponding to the length of the tubular member among the sounds generated at the back side of the speaker unit resonates in the tubular member and is emitted from the other end.

It is preferable that an open tubular member is longer than the closed tubular member. According to this, frequencies of fundamental vibration of the open tubular member and the closed tubular member do not completely match, and it is possible to inhibit the sound pressure of the sound emitted from the other end of the open tubular member from getting too high or too low at a specific frequency.

It is preferable that lengths of the open tubular member and the closed tubular member are set such that the frequency of the fundamental vibration in the closed tubular member becomes 0.75 times bigger than, and 1.25 times smaller than that of the fundamental vibration in the open tubular member. If the sound is emitted only against the open tubular member, the sound pressure becomes low when the frequency is 1.5 times the fundamental vibration and 2.5 times the fundamental vibration, and along with that, the sound pressure becomes high at double frequency. On the other hand, when the sound is emitted only against the closed tubular member, the sound pressure becomes high when the frequency is the same as the fundamental vibration and 3 times the fundamental vibration, and along with that, the sound pressure becomes low at double frequency. Since double frequency of the vibration of the closed tubular member is 1.5 times bigger than and 2.5 times smaller than the frequency of the fundamental vibration of the open tubular member, on a frequency range between them, the frequency when the sound pressure becomes minimum in the open tubular member and the frequency when the sound pressure becomes minimum in the closed tubular member do not match, and thus it is possible to inhibit the sound pressure of the sound emitted from the other end of the open tubular member from getting too low at a specific frequency.

It is preferable that the length of the open tubular member and that of the closed tubular member are set such that the frequency of the fundamental vibration in the open tubular member and the frequency of the fundamental vibration in the closed tubular member become the same. In the open tubular member, the sound pressure becomes maximal in double vibration, and in the closed tubular member, the sound pressure becomes maximal in the fundamental vibration and triple vibration, and the sound pressure becomes minimal in the frequency of the double fundamental vibration. Therefore, the frequency in which the sound pressure becomes maximum in the open tubular member, and the frequency in which the sound pressure becomes minimum in the closed tubular member become the same, and thus it is possible to inhibit the sound pressure of the sound emitted from the other end of the open tubular member from changing largely before and after this frequency.

The accommodating unit and the open tubular member or the closed tubular member may be formed integrally, and the open tubular member, the accommodating unit, and the closed tubular member may be formed integrally into a single tubular shape. According to this, it is possible to reduce the number of parts.

It is preferable that the other end of the tubular member is opening toward the intersection part where at least two of the plurality of surfaces surrounding the box-shaped space. Here, the mobile object forming the box-shaped space has plural surfaces, for example, in the travelling direction, it has the front surface, the rear surface, the left side, the right side, the lower surface (the bottom surface), and the upper surface (the top surface). Since the other end of the open tubular member is opening toward the intersection part where at least two of the plurality of surfaces surrounding the space intersect, the low sound emitted from the other end is reflected on at least two of the surfaces and echoes easily in the space of the mobile object, and it is possible to improve the acoustic characteristics of the low sound range of the speaker system for the mobile object.

It is preferable that the speaker unit is installed in the instrument panel to emit the sound from the front side on the upper surface of the instrument panel of the mobile object, and the open tubular member extends downward from the accommodating unit, and that at least one of the closed tubular member is provided in the pillar of the mobile object. According to this, since the speaker unit is provided in the instrument panel and emits the sound from the front side on the upper surface of the instrument panel, it is possible to make the emitted sound reach the passenger more easily. Further, at least one of the closed tubular members is provided in the pillar, thereby utilizing a free space in the mobile object effectively.

Further, the mobile object according to the present embodiment comprises any one of the above mentioned speaker systems for the mobile object. According to the mobile object like this, it is possible to mount the speaker system for the mobile object easily by utilizing the free space of, for example, a frame which is forming the mobile object (the vehicle body) in the mobile object effectively.

EXAMPLE

First Invention

An embodiment of the present invention will specifically be described below. In Example 2, the same reference signs are allocated to the same constituent members as those of Example 1 and to constituent members having the same functions as those of Example 1, and explanation thereof will be omitted.

Example 1

Figure 2:
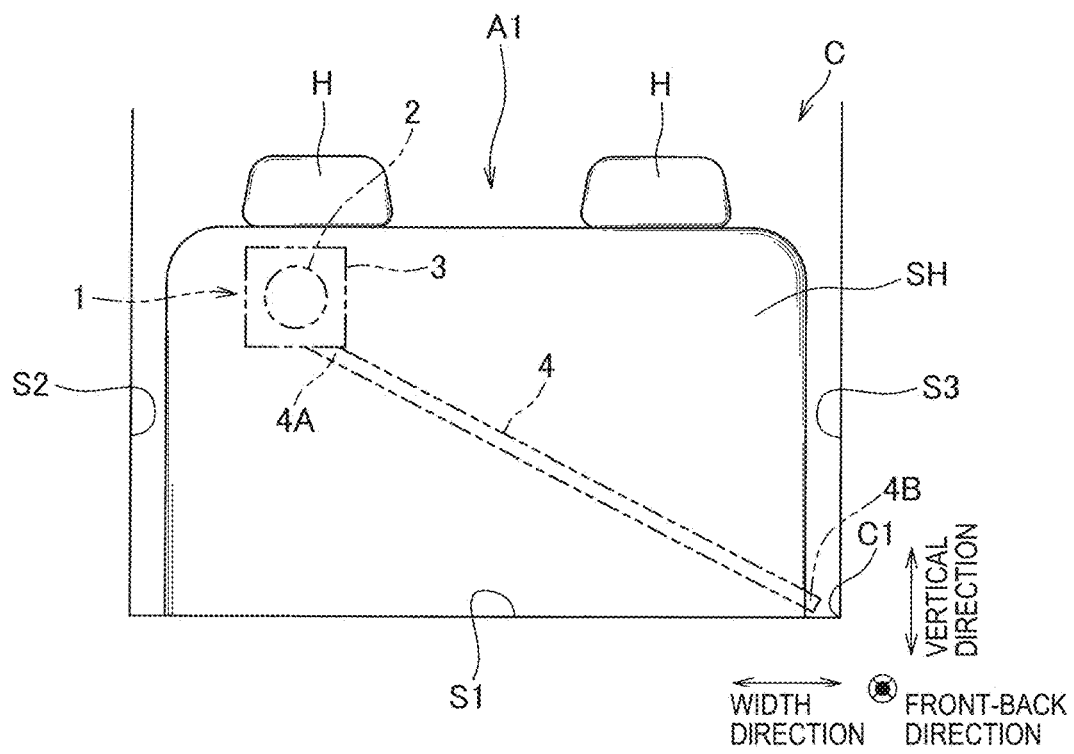
FIG. 2 is a rear view illustrating a location of the speaker system for the mobile object on the mobile object.
Figure 3:
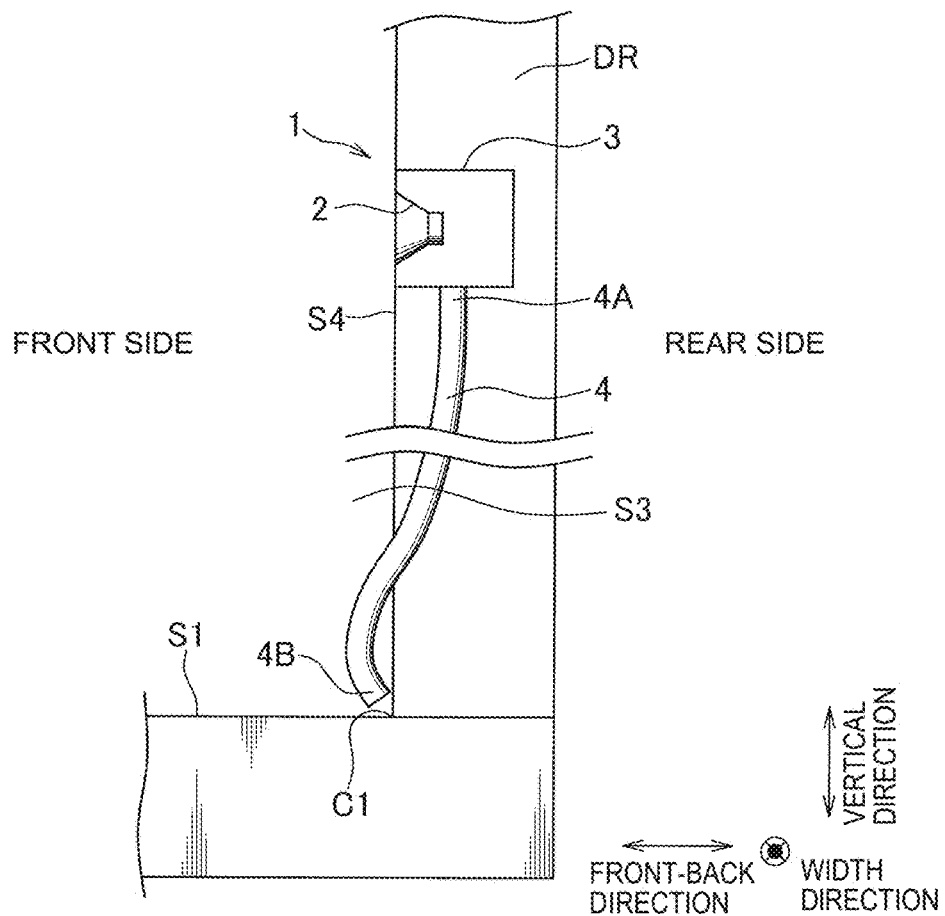
FIG. 3 is a side view illustrating the speaker system for the mobile object.
Figure 4:
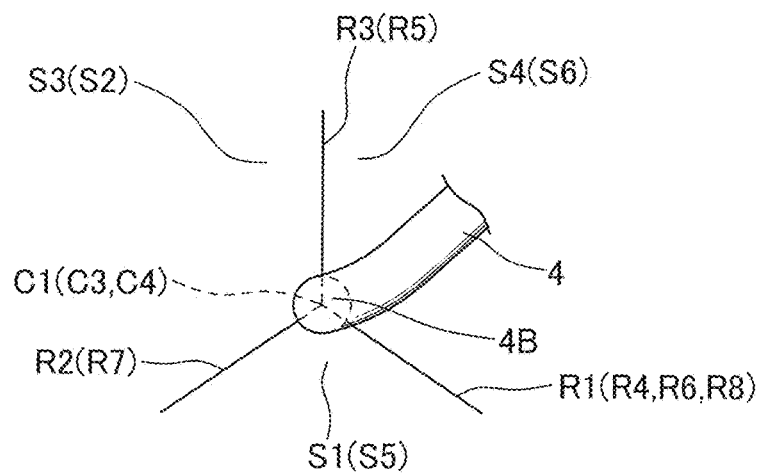
FIG. 4 is a perspective view illustrating a tubular member of the speaker system for the mobile object.

FIG. 1 is a rear view illustrating a vehicle C installed with a speaker system for a mobile object 1A according to Example 1 of the present invention, FIG. 2 is a rear view illustrating a location of the speaker system for the mobile object 1A on the vehicle C, FIG. 3 is a side view illustrating the speaker system for the mobile object 1A, and FIG. 4 is a perspective view illustrating a tubular member 4 of the speaker system for the mobile object 1A.

As illustrated in FIGS. 1 to 3, the speaker system for the mobile object 1A provided in the vehicle C as a mobile object includes a speaker unit 2, an enclosure 3 as an accommodating unit accommodating the speaker unit 2, and a tubular member 4 connected to the enclosure 3.

The vehicle C forms a box-shaped room space of the vehicle A1 surrounded by a not-shown inner surface of a windshield, an upper surface (a top surface), a lower surface (a bottom face) S1 of a vehicle body, a front surface in a travelling direction (a front-back direction) of the vehicle C, a pair of sides S2 and S3 (including a door body of the vehicle) facing each other in a width direction, and a rear surface S4 in the travelling direction of the vehicle C. Further, in the present example, let the vehicle C be a hatchback type and at the rear of the vehicle C, a back door DR as the door body in which an upper end is pivotally supported by the vehicle body is provided. Therefore, the rear surface S4 is formed by an inner surface of the back door DR.

The speaker unit 2 includes a vibration plate, a voice coil supported by the vibration plate, an edge which connects the vibration plate with the frame, a magnetic circuit which drives (vibrates) the voice coil, the frame which connects the voice coil with the frame, and a damper which suppresses the natural vibration of the vibration plate. The speaker unit 2 may emit sound wave to make sound pressure of a middle and high sound range (for example, 1,000 Hz to 10,000 Hz) higher than that of a low sound range (for example, 10 Hz to 1,000 Hz). Further, the vibration plate is provided with a side from which the speaker unit 2 emits the sound wave (a front surface side) facing the front of the vehicle C, and also with the magnetic circuit side (a back surface side) facing the back of the vehicle C. Further, a vibration direction (a sound emission direction) of the vibration plate of the speaker unit 2 may be directed to an appropriate direction, for example, the vibration direction may be directed to a headrest H of a back seat SH in the vehicle C, and also may be directed to the upper surface of vehicle C.

The enclosure 3 is formed in a box-shape and is also provided in a back door DR, on the front surface of which the vibration plate is placed, and has the speaker unit 2 placed in the internal space thereof formed by the top surface, the bottom surface, the rear surface and the two sides, and thus accommodating therein the back side of the speaker unit 2. Further, in a case where the speaker unit 2 is installed in the back door DR in a state that the vibration plate is inclined against a vertical direction, the front-back direction, and the width direction, the enclosure 3 may be provided having an inclined surface on the top surface to inhibit the sound wave emitted from the vibration plate from reflecting on a portion of the enclosure 3, and also such that the sound wave is emitted in the room space of the vehicle A1. Further, the enclosure 3 is provided in a position deviated from a center part of the back door DR to one side S2 (a left side when facing the front) in the width direction, and along with that, is provided in the central part of the back door DR in the vertical direction. That is, the enclosure 3 is provided such that the front surface of the speaker unit 2 is located in a rear side of the headrest H, and thus the sound wave emitted from the front surface of the speaker unit 2 heads to ears of a passenger easily. Further, the sound wave generated at the back side of the speaker unit 2 is emitted toward the internal space of the enclosure 3.

Note that the enclosure 3 may be provided at an appropriate location depending on frequency characteristics of the sound pressure of the speaker unit 2. For example, in a case where the sound pressure of the middle and high sound range is high and directivity of the sound wave is high in the speaker unit 2, the enclosure 3 may be provided in the back door DR, in a vicinity of ears of a passenger. Further, in the speaker unit 2, in a case where the sound pressure of the low sound range is high and the sound wave reflects easily in a lower surface S1 side, the enclosure 3 may be provided at a lower part of the back door DR. At this time, it may also be configured such that the sound wave emitted from the front surface of the speaker unit 2 heads to the front side passing through a backrest of the back seat SH.

The tubular member 4 is formed in a cylindrical shape having both its ends opened, using known metal, resin and the like, one end 4A of which is linked on the lower surface of the enclosure 3, also extends toward a rear side and a lower side. A shape of a section and a cross sectional area of the tubular member 4 are substantially constant from the one end 4A side to the other end 4B side, however, a configuration of the shape of the section may change appropriately, for example, such configurations are mentioned for example that the tubular member 4 gets fine or gets thick from the one end to the other end, or that the one end and the other end are formed and an interstitial part is formed finely. The one end 4A of the tubular member 4 is linked to the lower surface of the enclosure 3, thereby connecting the tubular member 4 to the internal space of the enclosure 3 at the one end 4A. Further, as described in FIGS. 2 and 3, the other end 4B is opening toward a corner C1 where the lower surface S1, the other side S3 (a side located on the right side when facing the front), and the rear surface S4 intersect.

The tubular member 4 extends from the one end 4A toward the corner C1 (that is, toward the lower side and the side S3 side), inside the back door DR, and protrudes forward from the rear surface S4 (the inner surface of the back door DR) in the vicinity of the other end 4B, and extends to get apart from the rear surface S4 once, and then extends as to come near the rear surface S4 again. That is, when being looked at in the width direction, the tubular member 4 has a bending shape which bulges out convexly toward the front side.

An advance and a reflection of the sound wave when the speaker unit 2 emitted the sound wave in the above mentioned speaker system for the mobile object 1A will be described. The sound wave generated at the back side of the speaker unit 2 echoes in the internal space of the enclosure 3, and along with that, enters the inside of the tubular member 4 from the one end 4A and advances in the tubular member 4. At this time, a component of the low sound range corresponding to the length of the tubular member 4 in the sound wave generated at the back side of the speaker unit 2 resonates in the tubular member 4. Therefore, the sound wave constituted mainly of the component of the low sound range is emitted from the other end 4B of the tubular member 4. In other words, a component of the middle and high sound range of the sound wave emitted from the other end 4B of the tubular member 4 has been cut. "Being cut" means that the sound pressure of the component of the middle and high sound range becomes lower than that of the component of the low range. The sound wave emitted from the other end 4B is reflected on the corner C1 and the surfaces S1, S3, and S4 around the corner C1, and echoes.

The sound wave is emitted as mentioned above, thereby echoing the sound wave having the component of the middle and high sound range emitted from the front side of the speaker unit 2 and the sound wave constituted mainly of the component of the low sound range emitted from the other end 4B of the tubular member 4, in the room space of the vehicle A1.

According to the above mentioned configuration, the speaker unit 2 and the enclosure 3 are placed in the back door DR, thereby mounting the speaker system 1A for the mobile object in the vehicle C easily, utilizing a free space in the vehicle C effectively.

Further, the enclosure 3 and the tubular member 4 include a space inside of them, and it is possible to absorb an impact when the impact is applied to the vehicle C at the rear (for example, when colliding with another mobile object or a structure) by the enclosure 3 and the tubular member 4 being compressed, and also it is possible to improve cushioning properties of the back door DR.

Further, since the other end 4B of the tubular member 4 is opening toward the corner C1 where three of a plurality of surfaces surrounding the room space of the vehicle A1 intersect, the low sound emitted from the other end 4B is reflected on the three surfaces and echoes easily in the room space of the vehicle A1, and it is possible to improve acoustic characteristics of the low sound range of the speaker system for the mobile object 1A.

Further, in a case where the speaker unit 2 emits the sound wave such that the sound pressure of the middle and high sound range becomes higher than that of the low sound range, it is possible to reduce amplitude of the voice coil or the vibration plate of the speaker unit 2, and thus it is also possible to inhibit an allophone resulted from a vibration transmitted to the vehicle body from being generated. Further, as described above, the acoustic characteristics of the low sound range is improved, thereby obtaining the good acoustic characteristics even when a small speaker unit 2 in which the sound pressure of the low sound range is low is utilized. Further, since the sound pressure of the low sound emitted from the front surface of the speaker unit 2 is relatively low, the sound wave emitted from the front side of the speaker unit 2 and the sound wave emitted from the other end 4B of the tubular member 4 do not weaken each other easily in the low sound range.

In the speaker system for the mobile object 1A, mainly the sound wave of the middle and high sound range is emitted from the front surface of the speaker unit 2, and mainly the sound wave of the low sound range is emitted from the other end 4B of the tubular member 4. There is a case where the most appropriate emission point of the middle and high sound range and that of the low sound range differ, but an emission point of the middle and high sound range and that of the sound wave of the low sound range are apart, thereby placing each of them at the most appropriate position, and thus it is possible to obtain the extremely good acoustic characteristics.

Example 2

Figure 5:
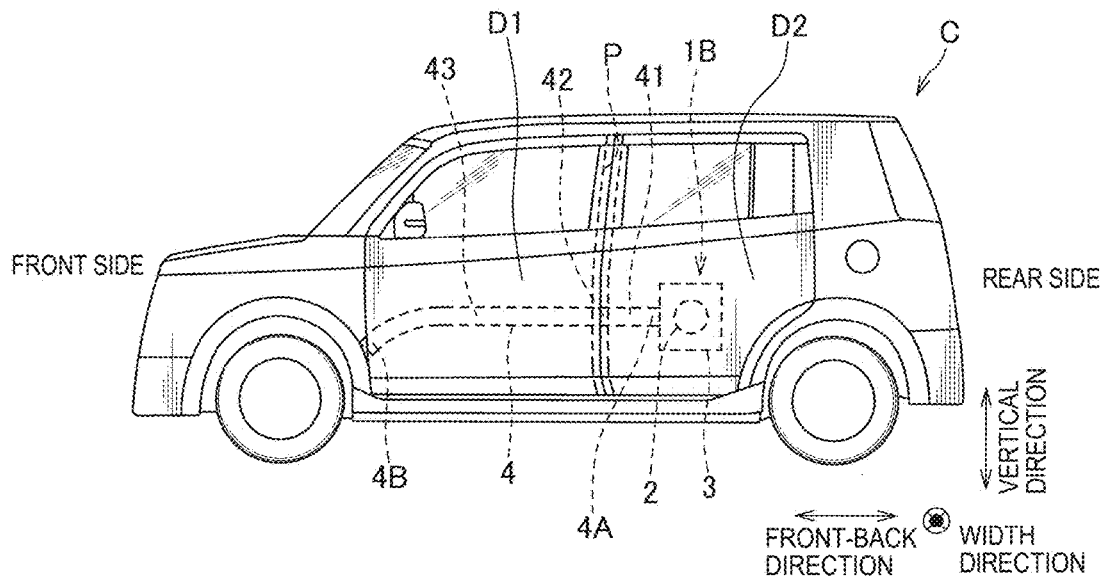
FIG. 5 is a side view illustrating a mobile object installed with a speaker system for a mobile object according to Example 2 of the present invention.
Figure 6A:
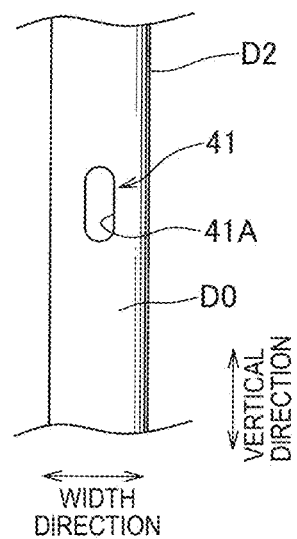
FIG. 6A is a front view illustrating a main part of the tubular member of the speaker system for the mobile object.
Figure 6B:
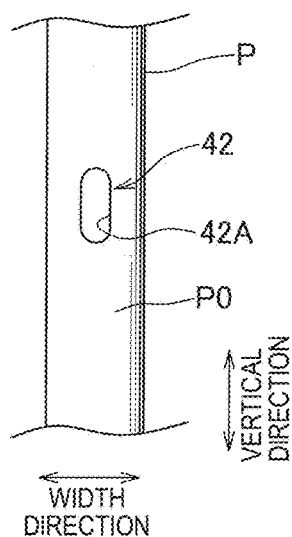
FIG. 6B is a rear view illustrating a main part of the tubular member of the speaker system for the mobile object.

FIG. 5 is a side view illustrating a vehicle C installed with a speaker system for a mobile object 1B according to Example 2 of the present invention, and FIG. 6A and 6B are a front view and a rear view, respectively, illustrating a main part of a tubular member 4 of the speaker system for the mobile object 1B.

As illustrated in FIG. 5, the speaker system for the mobile object 1B includes a speaker unit 2, an enclosure 3 and the tubular member 4. Let the vehicle C according to the present embodiment include a front side door D1 and a rear side door D2 as door bodies aligned in the front-back direction, and the front side door D1 and the rear side door D2 include a hinge-type opening-closing configuration. That is, inner surfaces of the front side door D1 and the rear side door D2 form the side which surrounds a room space of the vehicle.

Further, the vehicle body of the vehicle C includes a pillar section P which extends in the vertical direction between the front side door D1 and the rear side door D2, and also pivotally supports the rear side door D2. Note that the vehicle body includes a panel and a frame (a hollow frame), for example, and a monocoque body is mentioned for example. The pillar section P configures a front side part of peripheral edges of the rear side door D2 and is a part of the vehicle C which is opposite to the rear side door D2. Note that a speaker system for the mobile object 1B may be provided only on one side in the width direction, or two sets of the speaker systems for the mobile object 1B may be provided on both sides in the width direction.

The enclosure 3 is placed in the rear side door D2 and also the front surface of the speaker unit 2 therein is provided facing the room space of the vehicle. Note that the enclosure 3 may be provided in an appropriate location in the rear side door D2 in the vertical direction and the front-back direction.

The tubular member 4 includes a first door body tubular part 41 as a first tubular part placed in the rear side door D2, a peripheral edge tubular part 42 as a second tubular part placed in the pillar section P, a second door body tubular part 43 as a third tubular part placed in the front side door D1, and is extending toward the front side, from the one end 4A to the other end 4B. Note that the first door body tubular part 41, the peripheral edge tubular part 42, and the second door body tubular part 43 may be provided in appropriate locations in the rear side door D2, the pillar section P and the front side door D1.

As illustrated in FIG. 6A, the first door body tubular part 41 includes a first door side opening 41A which is opening at a front end surface D0 of the rear side door D2. Further, the peripheral edge tubular part 42 includes, as illustrated in FIG. 6B, the peripheral edge side opening 42A which is opening on a rear edge surface P0 of the pillar section P (that is, a surface which faces the front end surface D0 of the rear side door D2). The first door side opening 41A and the peripheral edge side opening 42A have almost the same shape and almost the same measurement, and also, in a state where the rear side door D2 is closed, are located opposed to each other, being placed in almost the same location both in the vertical direction and in the width direction. Therefore, when the rear side door D2 is closed, the first door side opening 41A and the peripheral edge side opening 42A overlap, thereby connecting the first door body tubular part 41 and the peripheral edge tubular part 42. Note that either one of the first door side opening 41A or the peripheral edge side opening 42A may be formed larger than the other.

Further, the peripheral edge tubular part 42 includes a similar opening part to the peripheral edge side opening 42A on a front edge surface of the pillar section P, and the second door body tubular part 43 includes a similar opening portion to the first door side opening 41A on a rear edge surface of the front side door D1. Therefore, when the front side door D1 is closed, these opening portions overlap each other, thereby connecting the peripheral edge tubular part 42 and the second door body tubular part 43. As described above, when the front side door D1 and the rear side door D2 are closed, the first door body tubular part 41, the peripheral edge tubular part 42 and the second door body tubular part 43 are connected, thereby making the tubular member 4 a single continuous tubular shape.

On the side of the other end 4B, protruding toward the room space of the vehicle from the inner side of the vehicle door D1, the second door body tubular part 43 extends toward a corner where the front surface, the lower surface, and the side surrounding the room space of the vehicle intersect, and is opening toward the corner.

According to the above mentioned configuration, the speaker unit 2 and the enclosure 3 are placed in the rear side door D2, thereby mounting the speaker system 1B for the mobile object in the vehicle C easily, utilizing a free space in the vehicle C effectively.

Further, the enclosure 3 and a part of the tubular member 4 are provided in the rear side door D2 of the side, thereby improving cushioning properties of the rear side door D2. Moreover, the part of the tubular member 4 is provided in the front side door D1, thereby improving the cushioning properties of the front side door D1.

Further, the first door side opening 41A in the front end surface D0 of the rear side door D2 and the peripheral edge side opening 42A formed on the rear edge surface P0 of the pillar section P overlap, thereby connecting the first door body tubular part 41 and the peripheral edge tubular part 42, and similarly, the peripheral edge tubular part 42 and the second door body tubular part 43 are connected, thereby providing the tubular member 4 across the rear side door D2, the pillar section P, and the front side door D1. Therefore, it is possible to form the tubular member 4 long, and along with that, it is also possible to place the other end 4B at a corner where the low sound easily echoes, by appropriately placing the tubular member 4 on the inner side of the each member.

The present invention is not limited to the above described Examples, but the invention includes other configurations which can achieve the object of the invention, and the following modifications are also included in the invention.

For example, as viewed from above in aforementioned Example 1, the single speaker system for the mobile object 1A is provided in the back door DR, and the enclosure 3 is provided in the position deviated from the central part in the width direction, however, two speaker systems for the mobile object may be provided in the back door DR and include symmetry in the width direction. Further, a configuration may be such that a single speaker system for the mobile object is provided in the back door DR and that the enclosure 3 is placed in the central part.

Further, as viewed from above in aforementioned Example 2, the single speaker system for the mobile object 1B is provided in the rear side door D2, however, the speaker system for the mobile object may be provided in the front side door D1. Further, a speaker system for the mobile object may be provided in each of the front side door D1 and the rear side door D2.

Further, as viewed from above in aforementioned Example 2, the opening part is formed on the each edge surface of the front side door D1, the pillar section P, and the rear side door D2, thereby providing the tubular member 4 across the front side door D1, the pillar section P, and the rear side door D2, however, the tubular member 4 is not limited to the configuration like this.

Figure 7:
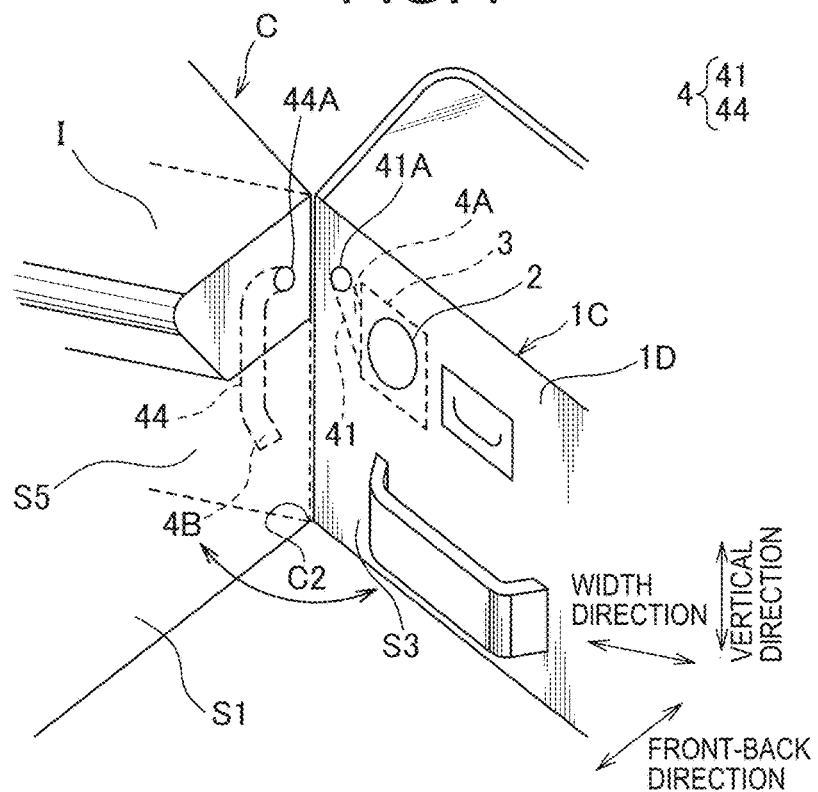
FIG. 7 is a perspective view illustrating a speaker system for a mobile object according to Modification Example 1 of the present invention.

For example, as illustrated as modification 1 in FIG. 7, a speaker system for the mobile object 1C may have the speaker unit 2 and the enclosure 3 provided in the front side door D1, and the tubular member 4 provided across the front side door D1 and an instrument panel I of the vehicle C. That is, the instrument panel I is a part of the vehicle C opposed to the inner side of the front side door D1 (a surface on the inner side in the width direction of the vehicle C) in the width direction of the vehicle C, and the tubular member 4 includes the first door body tubular part 41 as the first tubular part placed in the front side door D1 and an instrument panel tubular part 44 as the second tubular part placed in the instrument panel I. The first door body tubular part 41 includes the first door side opening 41A provided on the inner side of the front side door D1, and the instrument panel tubular part 44 includes the instrument panel opening part 44A provided on the outer side of the instrument panel I (the surface on the inner side in the width direction of the vehicle C). Further, on the side of the other end 4B of the tubular member 4, the instrument panel tubular part 44 protrudes toward the outer side of the instrument panel I and opening toward a corner C2 where the lower surface S1, the side S3, and the front surface S5 of the vehicle C intersect.

Figure 8:
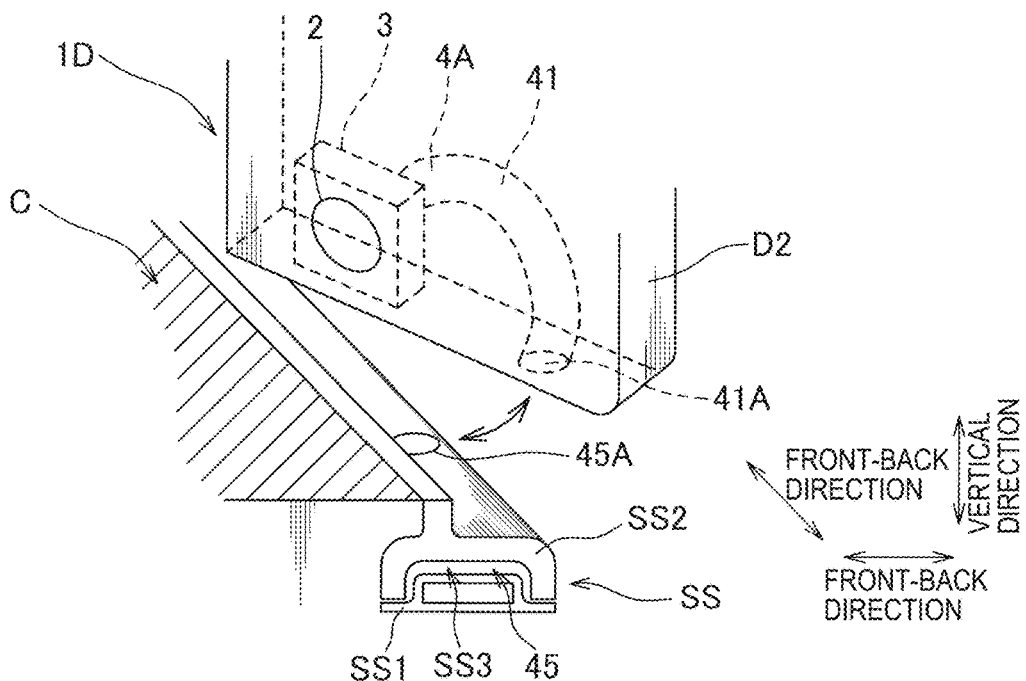
FIG. 8 is a perspective view illustrating a speaker system for a mobile object according to Modification Example 2 of the present invention.

Further, as illustrated as modification 2 in FIG. 8, a speaker system for a mobile object 1D may have the speaker unit 2 and the enclosure 3 provided in the rear side door D2, and the tubular member 4 provided across the rear side door D2 and the side sill SS of the vehicle C. The side sill SS is a part of the vehicle C opposed to the lower edge surface of the rear side door D2 (a surface of a lower side in the vertical direction of the vehicle C) in the vertical direction of the vehicle C, and includes a frame part SS1 which configures a vehicle body and an interior member SS2 which is a cover covering the frame part SS1, and between the frame part SS1 and the interior member SS2, a space SS3 is formed extending along a travelling direction of the vehicle C. The tubular member 4 includes the first door body tubular part 41 as the first tubular part placed in the rear side door D2 and a side sill tubular part 45 as the second tubular part which utilized a space SS3 of the side sill SS. The first door body tubular part 41 includes the first door side opening 41A which is provided on the lower edge surface of the rear side door D2, and a side sill tubular part 45 includes the side sill opening 45A which is opening on the upper surface of the interior member SS. Further, the side sill tubular part 45 is provided at an appropriate location in the vehicle C (for example, a location opening toward a corner on the front side or the rear side of the vehicle C) on the other end side of the tubular member 4.

According to modifications 1 and 2 described above, utilizing a free space in the vehicle C effectively, it is possible to mount the speakers for the mobile object 1C and 1D in the vehicle C easily. Further, in a case in which a location where a low sound echoes easily (that is, a preferable location in which the other end of the tubular member to be placed) is located in the vicinity of the back door, the tubular member is provided only on the back door and does not have to extend across two or more members.

Further, frequency-dependency of the sound wave which the speaker unit emits may be set appropriately. Even in a case where the sound pressure of the low sound range emitted by the speaker unit from the front side is high, and even when the sound wave from the front side and the sound wave from the other end weaken each other, if the sound pressure of the low sound which resonates in the tubular member and is emitted from the other end is high enough, it is possible to secure the sound pressure of the low sound. That is, in a case where the sound pressure of the low sound improves well enough by resonance in the tubular member, a speaker unit which emits the sound wave such that the sound pressure from the low sound range to the middle and high sound range remains about the same, or a speaker unit which emits the sound wave such that the sound pressure of the low sound range becomes higher than that of the middle and high sound range may be used, or the speaker unit for the middle and high sound range (a tweeter) may also be used. Further, a shape of the speaker unit is not specifically limited, and it may be a corn type or a dome type.

Further, in aforementioned Example 1, the other end 4B of the tubular member 4 opens toward the corner C1 where the lower surface S1, the side S3 and the rear surface S4 intersect, and as viewed from above in Example 2, opens toward a corner where the lower surface, the front surface and the side intersect, but the other end may be opening toward a corner (C3 and C4 illustrated in FIG. 4) where arbitrary three of a plurality of surfaces surrounding a room space of a vehicle A1 (an inner surface of a windshield, the upper surface, the lower surface S1, the front surface, the sides S2 and S3, and the rear surface S4) intersect. Further, the other end of the tubular member may be opening toward an intersection part where two of the plurality of surfaces intersect, or may be opening opposed to one of the plurality of surfaces.

Note that a corner C3 is a corner where the rear surface S4, the upper surface S5, the side S2 or the side S3, of the vehicle C intersect, and a corner C4 is a corner where the front surface S6, the upper surface S5, the side S2 or the side S3, of the vehicle C intersect. Further, an intersection part R1 is an intersection part where the rear surface S4 and the lower surface S2 of the vehicle C intersect, an intersection part R2 is an intersection part where the lower surface S2 and the side S2 or the side S3, of the vehicle C intersect, an intersection part R3 is an intersection part where the rear surface S4 and the side S2 or the side S3 of the vehicle C intersect, an intersection part R4 is an intersection part where the front surface S6 and the lower surface S1 of the vehicle C intersect, an intersection part R5 is an intersection part where the front surface S6 and the side S2 or the side S3 of the vehicle C intersect, an intersection part R6 is an intersection part where the front surface S6 and the upper surface S5 of the vehicle C intersect, an intersection part R7 is an intersection part where the upper surface S5 and the side S2 or the side S3 of the vehicle C intersect, and an intersection part R8 is an intersection part where the rear surface S4 and the upper surface S5 of the vehicle C intersect.

As a portion of the mobile object, the vehicle body and the interior member of the vehicle C as the aforementioned mobile object, the instrument panel I, a car interior constituting member such as an air-conditioning duct, and a combination of these and the like are mentioned for examples. Therefore, the side sill SS which is formed of the aforementioned frame part SS1 and the interior member SS2, and the instrument panel I are also portions of the mobile object.

Second Invention

Figure 9:
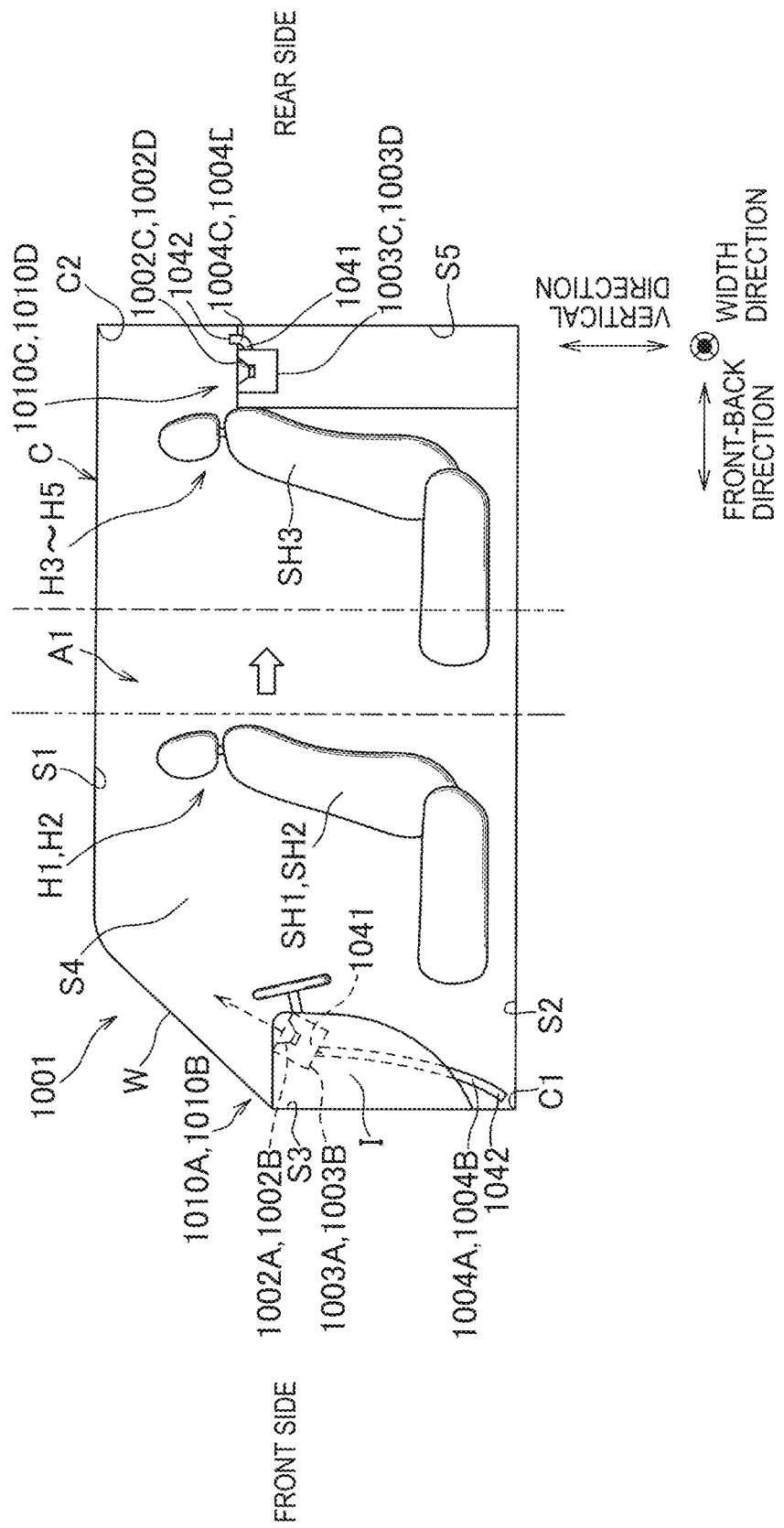
FIG. 9 is a side view illustrating a mobile object installed with a speaker system for a mobile object according to Example 3 of the present invention.
Figure 11:
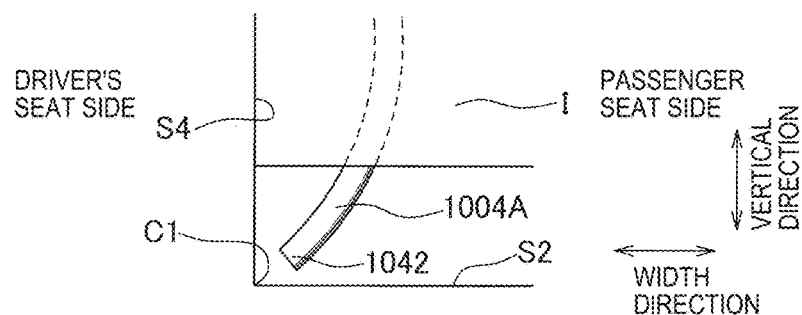
FIG. 11 is a front view illustrating a main part of the tubular member of the speaker system for the mobile object.
Figure 12:
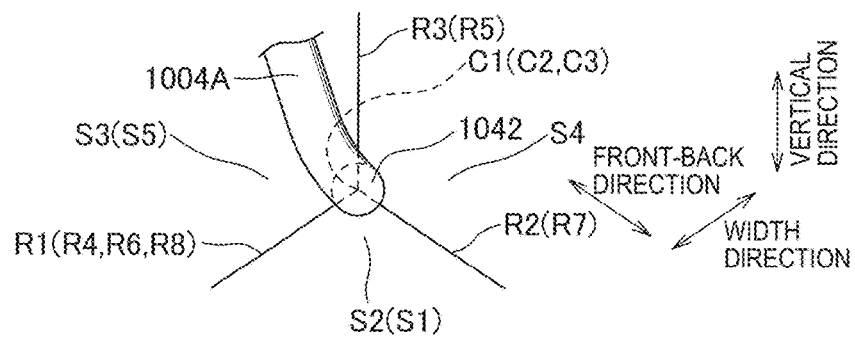
FIG. 12 is a perspective view illustrating the tubular member.
Figure 13:
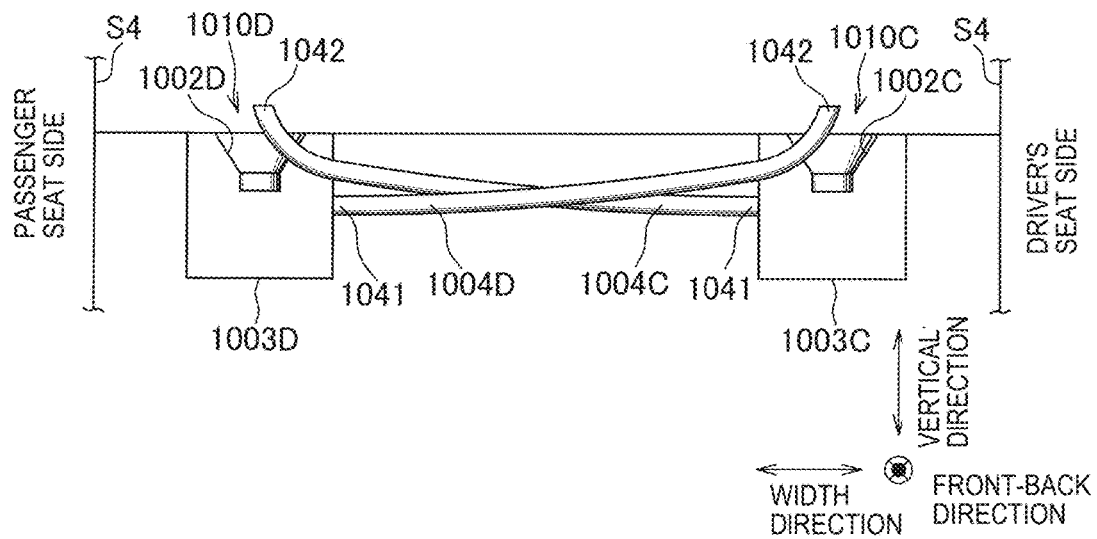
FIG. 13 is a rear view illustrating a speaker device on a rear side of the speaker system for the mobile object.
Figure 14:
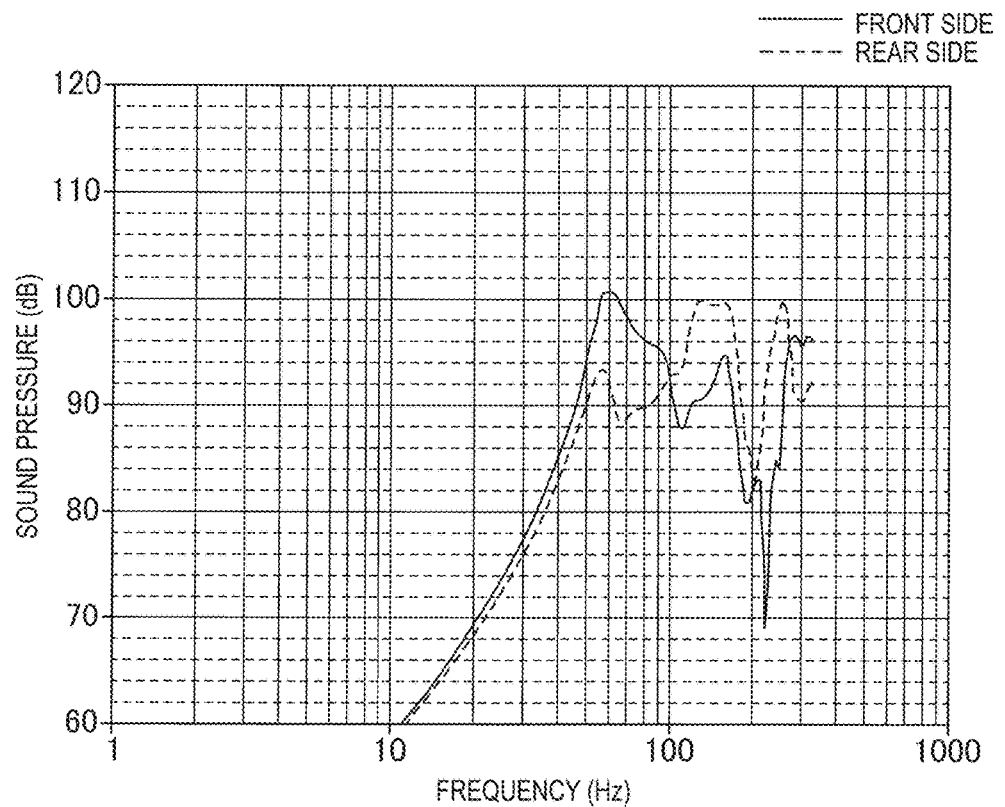
FIG. 14 is a graph showing characteristics on sound pressure of a speaker system for a mobile object according to Modification Example 3 of the present invention.
Figure 15:
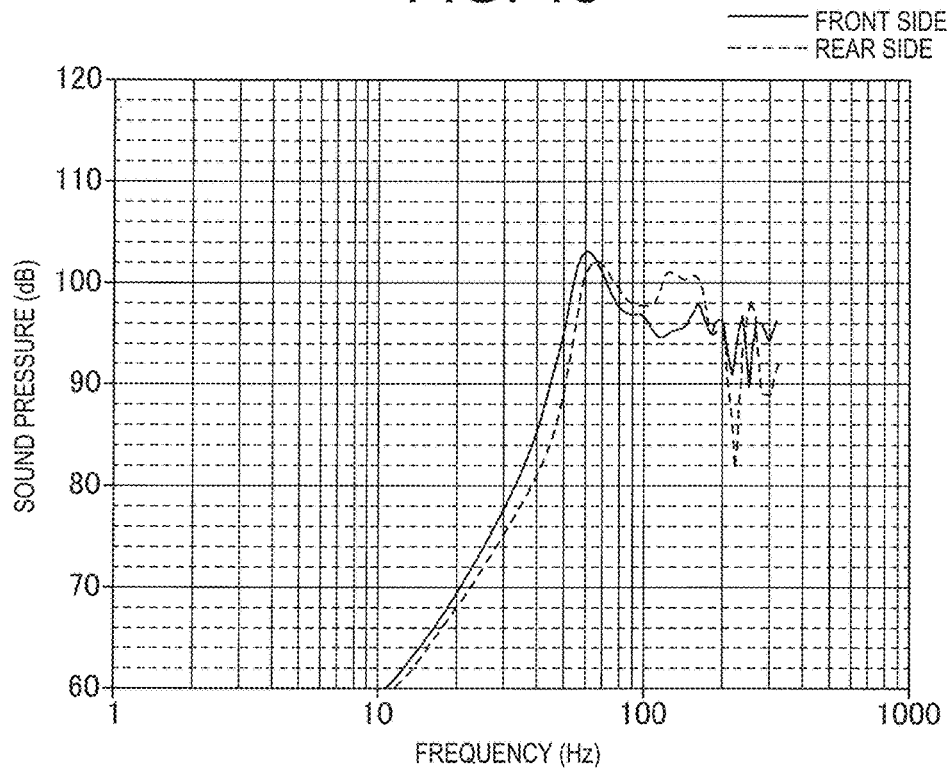
FIG. 15 is a graph showing characteristics of sound pressure of a speaker system for a mobile object according to Example 3.

An embodiment of the present invention will specifically be described below. FIG. 9 is a side view illustrating a vehicle C installed with a speaker system for a mobile object 1 according to Example 3 of the present invention, FIG. 10 is a plan view illustrating the vehicle C installed with the speaker system for the mobile object 1, FIG. 11 is a front view illustrating a main part of a tubular member 4 of the speaker system for the mobile object 1, FIG. 12 is a perspective view illustrating the tubular member 4, FIG. 13 is a rear view illustrating a speaker device 10C and a speaker device 10D on the rear side of the speaker system for the mobile object 1, FIG. 14 is a graph showing characteristics of sound pressure of a speaker system for a mobile object according to a modification on the present invention, FIG. 15 is a graph showing characteristics of sound pressure of a speaker system for a mobile object 1 according to Example 3.

Figure 10:
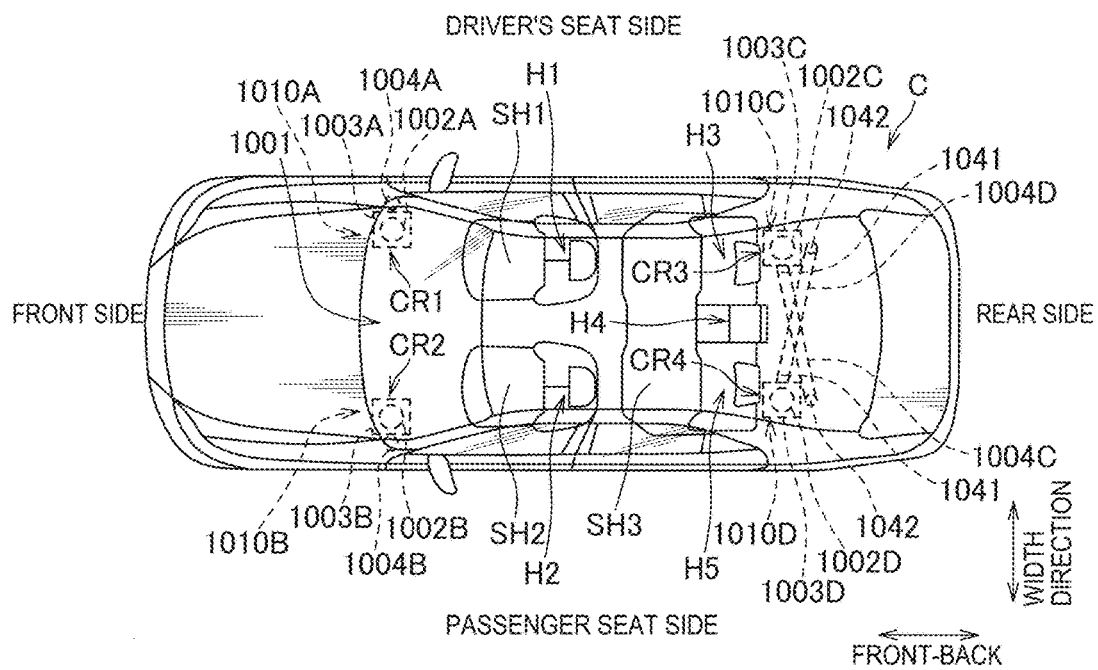
FIG. 10 is a plan view illustrating the mobile object installed with the speaker system for the mobile object.

As illustrated in FIG. 9 and FIG. 10, a speaker system for a mobile object 1001 is installed in the vehicle C as a mobile object and includes four speaker devices 1010A to 1010D.

The vehicle C forms a box-shaped room space of a vehicle A1 surrounded by an inner surface of a windshield, an upper surface (a top face) S1 of a vehicle body, a lower surface (a bottom surface) S2, a front surface S3 in a travelling direction (a front-back direction) of the vehicle C, a pair of sides S4 (including a door body of the vehicle) opposed to each other in a width direction, and a rear surface S5 in the travelling direction of the vehicle C. Further, the instrument panel I is provided on the front surface S3, and a driver's seat SH1 as a front seat and a passenger seat SH2 are provided opposed to a rear side of the instrument panel I. Further, the three-seater bench-like back seat SH3 is provided in a rear side of the driver's seat SH1 and the passenger seat SH2. Head positions of passengers seating on the driver's seat SH1 and the passenger seat SH2 are hereinafter referred to as head positions H1 and H2 respectively, and head positions of passengers seating on respective seating positions of the back seat SH3 are hereinafter referred to as head positions H3 to H5.

A speaker device 1010A is provided at a corner C1 on a front side of a front-back direction and the driver's seat SH1 side in the width direction (in an example of the diagram, on the right when facing the front side) in the room space of the vehicle A1. A speaker device 1010B is provided at a corner C2 of the passenger seat SH2 side (in an example shown in the diagram, on the left when facing the front side) on the front side and in the width direction in the room space of the vehicle A1. A speaker device 1010C is provided at a corner C3 on the rear side and in the front-back direction and on the driver's seat SH1 side in the room space of the vehicle A1. A speaker device 1010D is provided at a corner CR4 on the rear side and in the passenger seat SH2 side in the room space of the vehicle A1. That is, the four speaker devices 1010A to 1010D are provided at the corners CR1 to CR4 which are different from one another. The four speaker devices 1010A to 1010D are placed in the room space of the vehicle A1, thereby generating a standing wave in the front-back direction and in the width direction in the vehicle C, and it becomes possible to improve acoustic characteristics in the room space of the vehicle A1. Further, since the sound wave is emitted from the speaker devices 1010A to 1010D to the passengers seating on the driver's seat SH1, the passenger seat SH2, and the back seat SH3, the passengers are able to listen to reproduced sound with presence, and it is possible to make the room space of the vehicle A1 be a pleasant space. This time, the speaker device may be provided at the corner, the speaker devices 1010C and 1010D in the rear side may be accommodated in the back door just like aforementioned Example 1, and later-described tubular members 1004C and 1004D may extend in the back door.

Respective ones of the speaker devices 1010A to 1010D include speaker units 1002A to 1002D, enclosures 1003A to 1003D as accommodating units accommodating the speaker units 1002A to 1002D, and tubular members 1004A to 1004D connected to the enclosures 1003A to 1003D. The speaker device 1010A in the front side and the speaker device 1010B opposed in the width direction are configured substantially plane-symmetrically having a surface which is substantially intersecting in the width direction as a plane of symmetry. Further, the speaker device 1010A in the rear side and the speaker device 1010D also include the same symmetry. Therefore, in the following description, in a case where only one of the speaker devices 1010A and 1010B is explained, let the other also have the same configuration, and in a case where only one of the speaker devices 1010C and 1010D is explained, let the other also have the same configuration.

The speaker units 1002A to 1002D include a vibration plate, a voice coil which is supported by the vibration plate, an edge which connects the vibration plate to a frame, a magnetic circuit which drives (vibrates) the voice coil, the frame which supports the edge and the magnetic circuit, and a damper which connects the voice coil to the frame. The speaker units 1002A to 1002D may emit a sound wave such that sound pressure of a middle and high sound range (for example, 1,000 Hz to 10,000 Hz) becomes higher than that of a low sound range (for example, 10 Hz to 1,000 Hz). Further, the vibration plate is provided such that a side (a front surface side) from which the speaker units 1002A to 1002D emit the sound wave faces an upper part of the vehicle C, and along with that the magnetic circuit side (the back side) faces a lower part of the vehicle C. Further, the speaker units 1002A and 1002B may be provided in the instrument panel I so that a vibration direction (a sound emission direction) of the vibration plate of the speaker units 1002A and 1002B in the front side inclines at a predetermined degree (for example, 30 degrees) against the upper surface of the instrument panel I. Further, the speaker units 1002C and 1002D in the rear side may be provided so that the vibration direction (or a sound emission direction) of the vibration plate may substantially intersect the upper surface S1. Note that in a case where the speaker unit is installed in the instrument panel in a state where the vibration plate is inclined against the upper surface of the instrument panel I, an angle of inclination of the each vibration plate against the upper surface of the instrument panel I may be set appropriately as necessary according to an angle of the windshield W, a distance between the speaker units 1002A to 1002D and the seat SH or the like, and in such a case, a central axis or the vibration plate of the speaker units 1002A to 1002D may not have to be inclined. In a case where not to let the central axis or the vibration plate of the speaker units 1002 incline, the speaker units 1002 may be installed so that the vibration plate is placed along the upper surface of the instrument panel I. Further, the central axis or the vibration plate of the speaker units 1002A to 1002D may be facing each of the seats SH1 and SH2 (on the back seat SH3, each seating position).

The enclosures 1003A to 1003D are formed in a box-shape and on a top surface of which the vibration plate is placed, and have the speaker units 1002A to 1002D placed in an internal space thereof formed by a bottom surface and four sides, and thus accommodating therein a part in the rear side of the speaker units 1002A to 1002D. The enclosures 1003A and 1003B in the front side are, for example, provided in the instrument panel I, and the enclosures 1003C and 1003D in the rear side are, for example, provided above a trunk. Further, the enclosures 1003A to 1003D may be provided such that the top surface has an inclined surface inhibiting the sound wave emitted from the vibration plate from reflecting on a part of the enclosure 1003, and at the same time, lets the sound wave be emitted in the room space of the vehicle A1. Further, the enclosures 1003A to 1003D are placed in the vicinity of the side S4 in the width direction, and also placed at the corners CR1 to CR4 respectively.

The speaker units 1002A and 1002B on the front side are accommodated in the enclosures 1003A and 1003B mentioned above, thereby being provided in the instrument panel I to emit the sound wave from the front surface, on the upper surface of the instrument panel I. Further, the speaker units 1002A and 1002B in the rear side are provided above the trunk to emit the sound wave from the front surface toward the upper surface S1. Further, the sound waves generated at the back side of the speaker units 1002A to 1002D are emitted toward the internal space of the enclosures 1003A to 1003D.

The tubular members 1004A to 4D formed in a cylindrical shape having both their ends opened, are made of known metal, resin and the like, and a shape of a section and a cross sectional area are substantially constant from one end 1041 side to the one end 1042 side, and are formed making their lengths have resonance frequency (for example, 30 Hz to 100 Hz). Note that the tubular members 1004A and 1004B in the front side and the tubular member 1004C and 1004D in the rear side have about the same length, respectively, and on the speaker units 1002A to 1002D, respective amounts of time required from a beginning of operation (a vibration of the vibration plate) to emission of the sound wave from the later-described other end 42 are about the same.

Since the one end 1041 is linked to the lower surface as the back side of the speaker units 1002A and 1002B in the enclosures 1003A and 1003B, the tubular members 1004A and 1004B are connected to the internal space of the enclosures 1003A and 1003B, and along with that, the other end 1042 is placed in a foot part of the driver's seat SH1 or the passenger seat SH2 (in the case of the driver's seat SH1, the vicinity of an accelerator pedal). Further, as illustrated in FIGS. 11 and 12, in the lower side of the instrument panel I, the one end 1042 is opening toward the corner C1 where the front surface S3, the lower surface S2, and the side S4 intersect. Further, the tubular members 1004A and 1004B pass through the instrument panel I on the one end 1041 side, and are protruding to the outside of the instrument panel I on the side of the other end 1042. Further, from the one end 1041 to the other end 1042 in the width direction, the tubular member 1004A in the driver's seat SH1 side extends to get apart once from the back the side S4 in the driver's seat SH1 side, and then extends as to come near the side S4 again. That is, when being looked at in the front-back direction, the tubular member 1004A has a bending shape which is bulging out convexly toward the passenger seat side. Further, the tubular members 1004A and 1004B extend so as to be directed toward the front side as approaching to the other end 1042 from the one end 1041 in the front-back direction.

As illustrated in FIG. 13, by being linked to the one end 1041 on the inner side of the enclosures 1003C and 1003D in the width direction of the mobile object, the tubular members 1004C and 1004D in the rear side are connected to the internal space of the enclosures 1003C and 1003D, and also, extend toward the outside. That is, from the one end 1041 to the other end 1042, the tubular member 1004C in the driver's seat SH1 side extends from the enclosure 1003C toward the passenger seat SH2 side, and the tubular member 1004D in the passenger seat SH2 side extends from the enclosure 1003D toward the driver's seat SH1 side. The tubular members 1004C and 1004D extend toward the rear side from the one end 1041 to the other end 1042 in the front-back direction of the vehicle C, and the other end 1042 of the tubular member 1004C is located in the rear side of the enclosure 1003D. Thus, the tubular members 1004C and 1004D extend intersecting each other. Although being apart from the upper surface S1, the other end 1042 of the tubular members 1004C and 1004D is opening toward the corner C2 where the upper surface S1, the rear surface S5, and the side S4 intersect. Note that let the corner be a part where three surfaces intersect, and be included in an intersection part where at least two surfaces intersect. That is, the corner C1 in the front side functions as the intersection part in the front side, and the corner C2 in the rear side functions as the intersection part in the rear side.

An advance and a reflection of the sound wave when the speaker units 1002A to 1002D emitted the sound wave in the above mentioned speaker system for the mobile object 1001 will be described. First, the sound wave emitted from the front surface of the speaker units 1002A and 1002B in the front side, for example, in a case where the vibration plate has a corn shape or a dome shape, advances to a diagonal rear side corresponding to an inclination of the vibration plate, and heads to locations of the head parts H1 and H2 in the front side. Note that the sound wave emitted from the front side may be reflected on the windshield W and the upper surface S1, and may head to the locations of the head parts H1 and H2. On the other hand, the sound wave emitted from the front surface side of the speaker units 1002C and 1002D in the rear side, directly or reflected on the upper surface S1 or the rear surface S5, heads to locations of head parts H3 to H5 in the rear side.

The sound wave generated at the back side of the speaker units 1002A to 1002D echoes in the internal space of the enclosures 1003A to 1003D, and along with that, enters the inside of the tubular members 1004A to 1004D from the one end 1041 and advances in the tubular members 1004A to 1004D. At this time, a component of a low sound range corresponding to the lengths of the tubular members 1004A to 1004D among the sound waves generated at the back side of the speaker units 1002A to 1002D resonates in the tubular members 1004A to 1004D. Therefore, the sound wave constituted mainly of the component of the low sound range is emitted from the other end 1042 of the tubular members 1004A to 1004D. In other words, a component of the middle and high sound range among the sound waves emitted from the other end 1042 of the tubular member 1004 has been cut. "Being cut" means that the sound pressure of the component of the middle and high sound range becomes lower than that of the component of the low range. The sound wave emitted from the other end 1042 of the tubular members 1004A and 1004B is reflected on the corner C1 and the surfaces S2 to S4 surrounding the corner C1, and advances toward the corner C2 opposed to the corner C1 (that is, the corner C2 in an opposite side of the corner C1 in the width direction). On the other hand, the sound wave emitted from the other end 1042 of the tubular members 1004C to 1004D in the rear side is reflected on the corner C2 and the surfaces S1, S5, and S4 around the corner C2, and advances toward the corner C1 in the opposite side.

A standing wave is formed between the corners C1 and the corners C2 which oppose to each other in the front-back direction and the width direction of the vehicle C, by the sound wave which is emitted from the tubular member 1004A, the other end 1042 of the tubular member 1004B in the front side and heads to the corner C2, and the sound wave which is emitted from the tubular member 1004C, the other end 1042 of the tubular member 1004C in the rear side and heads to the corner C1. The standing wave has the corner C1 and the corner C2 as fixed ends, and includes the sound wave corresponding to an interval of the corners C1 and the corners C2.

The sound wave is emitted as mentioned above, thereby echoing the sound wave constituted mainly of the component of the middle and high sound range emitted from the front side of the speaker units 1002A to 1002D, and the sound wave constituted mainly of the component of the low sound range emitted from the other end 1042 of the tubular members 1004A to 1004D in the room space of the vehicle A1.

At this time, as precisely explained next, the speaker units 1002A and 1002B in the front side, and the speaker units 1002C and 1002D in the rear side operate with a predetermined time difference so that a node of the standing wave becomes apart from the head positions H2 and H2 in the front side to the rear side. Here, as the predetermined time difference, 1 ms to 9 ms are mentioned for example.

First, as a modification, a case where the sound wave is emitted from the other end 1042 of the tubular member 1004A in the front side, and from the other end 1042 of the tubular member 1004C in the rear side almost simultaneously (that is, of a coordinate phase) is considered. As illustrated in FIG. 9 with two-dot chain lines, in the standing wave having about the same sound wave in an interval between the corners C1 and C2 of the tubular member 1004A, an intermediate position of the corners C1 and the corners C2, that is, a central part in the front-back direction of the room space of the vehicle A1, becomes the node. The node is located in the rear side and the vicinity of the head positions H1 and H2, and the sound pressure of the frequency decreases as the location becomes closer to the node. Hence, in order to place the node of the standing wave at a location illustrated with a dashed chain line, let the speaker unit 1002A and the speaker unit 1002C be operated with a time difference.

Here, a change of the characteristics of the sound pressure caused by differentiating operation timing of the speaker unit 1002A in the front side and that of the speaker unit 1002C in the rear side will be described. First, the characteristics of the sound pressure is illustrated in FIG. 14 in a case where letting the speaker units 1002A and 1002C operate almost simultaneously as the speaker system for the mobile object in the modification to form the node in the standing wave at a location which is illustrated with the two-dot chain line in FIG. 9. A horizontal axis in FIG. 14 indicates a frequency displayed logarithmically, and a vertical axis indicates the sound pressure, and the characteristics of the sound pressure mean frequency-dependency of the sound pressure. A solid line in the graph shows the sound pressure in the head positions H1 and H2 in the front side, and a broken line shows the sound pressure of the head positions H1 to H3 in the rear side. The interval of the corners C1 and of the corners C2 is about 1.7 m.

The sound pressure at the head positions H1 and H2 in the front side and the head positions H1 to H3 in the rear side indicated the minimum value (about 69 dB and about 82 dB each) in 200 Hz to 210 Hz. The sound pressure at the head positions H1 and H2 of the front side and the head positions H1 to H3 in the rear side indicated the minimum value (about 69 dB and about 82 dB each) in 200 Hz to 210 Hz. When being converted into a wavelength, this frequency becomes about the same as the interval of the corners C1 and of the corners C2. That is, it can be considered that the standing wave having the wavelength about the same as the interval of the corners C1 and of the corners C2 is formed, and that the sound pressure was decreased by the node in the standing wave.

Next, the characteristics of the sound pressure is illustrated in FIG. 15 in a case where letting the speaker units 1002A and 1002C operate with a time difference in the speaker system for the mobile object 1001 in Example 3 to form the node in the standing wave at a location which is illustrated with a broken line in FIG. 9. An axis in FIG. 15 is the same as FIG. 14, a solid line in the graph shows the sound pressure in the head positions H1 to H2 in the front side, and a broken line shows the sound pressure in the head positions H1 to H3 in the rear side.

The Sound pressure in the head positions H1 and H2 in the front side becomes 91 dB in 200 Hz to 210 Hz, which is hardly decreasing comparing with sound pressure in frequencies before and after 200 Hz to 210 Hz, and a large decrease was not seen in other frequencies either. Further, the sound pressure in the head positions H3 to H5 in the rear side indicated the minimum value (about 82 dB) in 200 Hz to 210 Hz. Therefore, an improvement of the characteristics of the sound pressure was confirmed at the frequency corresponding to a wavelength of the standing wave by letting the speaker units 1002A and 1002C in the front and the rear operate with a time difference, and placing the location of the node in the standing wave apart to the rear side from the head positions H1 and H2 in the front side.

According to the above mentioned configuration, since the speaker system for the mobile object 1001 has the four speaker devices 1010A to 1010D and respective ones of which are placed at the corners CR1 to CR4 of the vehicle C, even when a free space at each of the corners CR1 to CR4 is small, it is possible to improve the sound pressure of an emitted sound of the entire speaker system for the mobile object 1001 and to improve the acoustic characteristics.

Further, since the one ends 1041 of the tubular members 1004A to 1004D are connected to the inner space of the enclosures 1003A to 1003D, the component of the low sound range corresponding to the length of the tubular members 1004A to 1004D among sound waves generated at the back side of the speaker units 1002A to 1002D resonates in the tubular members and is emitted from the other end 1042. Since the other ends 1042 of the tubular members 1004A to 1004D are opening toward the corners C1 and C2 where at least three of a plurality of surfaces surrounding the room space of the vehicle A1 intersect, the low sound emitted from the other end 1042 is reflected on three surfaces and echoes easily in the room space of the vehicle A1, and it is possible to improve the acoustic characteristics of the low sound range of the speaker system for the mobile object 1001.

Further, in a case where the speaker units 1002A to 1002D emit the sound wave such that the sound pressure of the middle and high sound range becomes higher than that of the low sound range, it is possible to reduce the vibration of the speaker units 1002A to 1002D and thus it is also possible to inhibit an allophone from being generated that is resulted from a vibration transmitted to the vehicle body. Further, as described above, the acoustic characteristics of the low sound range are improved, thereby obtaining the good acoustic characteristics even when the small speaker units 1002A to 1002D in which the sound pressure of the low sound range is low are utilized. Further, since the sound pressure of the low sound emitted from the front side of the speaker units 1002A to 1002D is relatively low, the sound wave emitted from the front side of the speaker units 1002A to 1002D and the sound wave emitted from the other end 1042 of the tubular members of 1004A to 1004D do not weaken each other easily in the low sound range.

In the speaker system 1001 for the mobile object, mainly the sound pressure of the middle and high sound range is emitted from the front surface of the speaker units 1002A to 1002D, and mainly the sound pressure of the low sound range is emitted from the other end 1042 of the tubular members 1004A to 1004D. While there is a case where the most appropriate emission point of the middle and high sound range, and that of the low sound range differ, an emission point of the middle and high sound range and an emission point of the sound wave of low sound range are apart, thereby placing each of them at the most appropriate position, and thus it is possible to obtain the extremely good acoustic characteristics.

Further, the speaker units 1002A and 1002B and the enclosures 1003A and 1003B are provided in the instrument panel I, and along with that, the tubular members 1004A and 1004B pass through the inside of the instrument panel I, thereby keeping an appearance good in a case where the speaker system for the mobile object 1001 is provided in the vehicle C.

Note that the present invention is not limited to the aforementioned Example 3, but includes other configurations which can achieve the object of the invention, and the following modifications are also included in the invention.

For example, in the aforementioned Example, the speaker units 1002A and 1002B in the front side, and the speaker units 1002C and 1002D in the rear side operate with a time difference so that the node of the standing wave becomes apart from the head positions H2 and H2 in the front side to the rear side, and the time difference may be set appropriately corresponding to a relationship between a location of the node in a case where there is no time difference and the head positions H1 to H5. For example, when the node is located in the more front side than the head positions H1 and H2 in a case where there is no time difference, the time difference may be something such that the node becomes more apart from the head positions H1 and H2 to the front surface side of the vehicle C. Further, when the node is located in the vicinity of the head positions H3 to H5 in the rear side in a case where there is no time difference, the time difference may be something such that the node becomes more apart from the head positions H3 to H5 to the front side of the vehicle C. Further, when the vehicle includes one row or more than 3 rows of seats in the front-back direction, the time difference may be set corresponding to a relationship between the location of the node in a case where there is no time difference, and a head position of the each row. Further, in a case where the head position and the location of the node are distant enough from each other, and in a case where a decrease of the sound pressure by the node is small, the speaker units in the front and the rear of the vehicle C may be operated almost simultaneously without setting such a time difference.

Further, the location of the node concerning the standing wave having the wavelength about the same as the interval of the corners C1 and of the corners C2 is to be changed as viewed from above in the aforementioned Example, but a location of the node concerning a standing wave having a different frequency may also be changed. For example, in the standing wave having about two-thirds of the wavelength of the interval, two nodes are formed between the corners C1 and between the corners C2, and the time difference may be set so that the nodes become more apart from any of the head positions H1 to H5 of respective seats to the front side or the rear side of the vehicle C.

Figure 16:
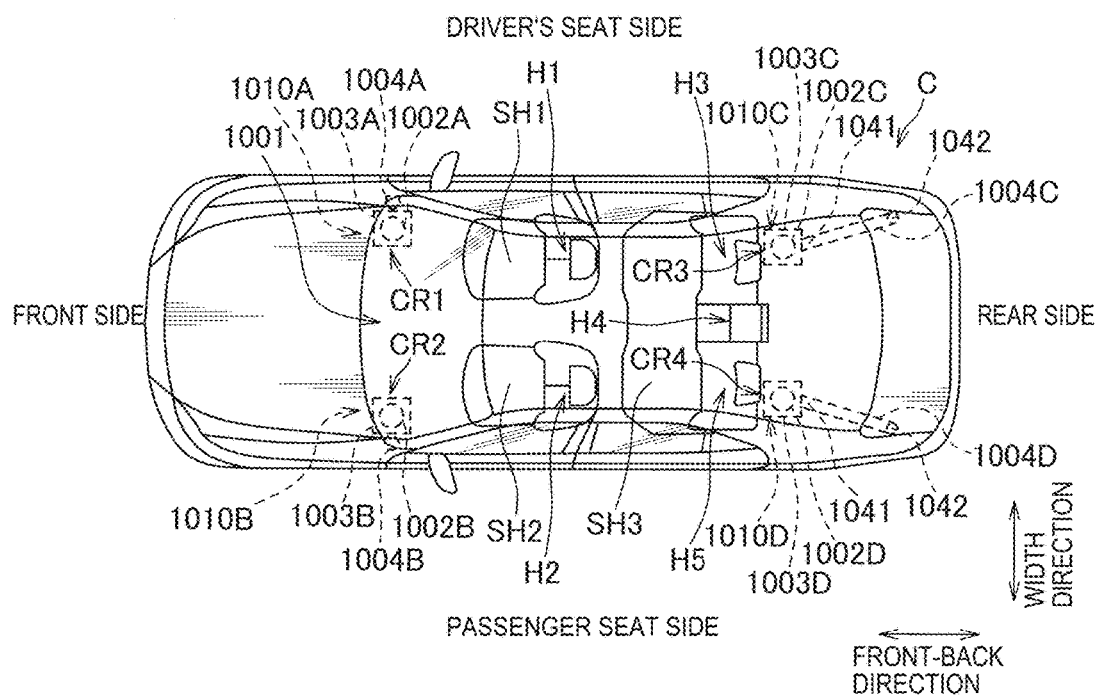
FIG. 16 is a plan view illustrating a mobile object installed with a speaker system for a mobile object according to Modification Example 4 of the present invention.
Figure 17:
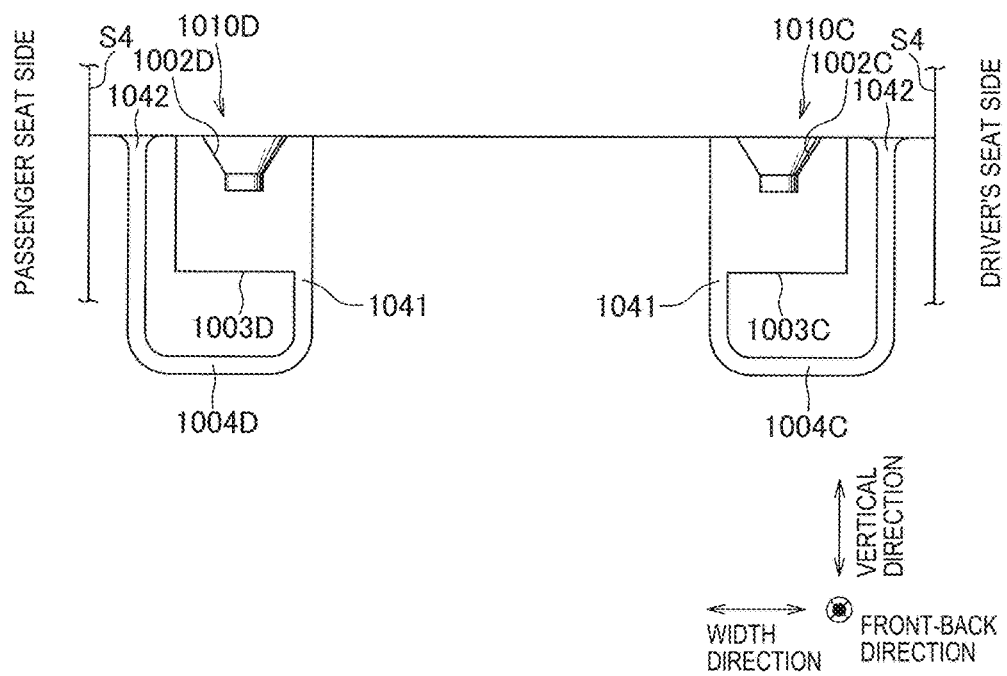
FIG. 17 is a rear view illustrating a speaker device on the rear side of the speaker system for the mobile object.

Further, in the speaker devices 1010C and 1010D provided in the rear side of the vehicle C, the tubular member 1004C extends toward the passenger seat side from the driver's seat side in the width direction, the tubular member 1004D extends toward the driver's seat side from the passenger seat side in the width direction, and the tubular member 1004C and the tubular member 1004D intersect, as viewed from above in the aforementioned Example, but as illustrated in FIGS. 16 and 17, it may also be configured such that the tubular member 1004C and the tubular member 1004D extend toward the rear side in the travelling direction of the vehicle C, and that the tubular member 1004C and the tubular member 1004D do not intersect.

Further, the speaker system for the mobile object 1001 is installed with the four speaker devices 1010A to 1010D which are provided at the four corners CR1 to CR4 of the vehicle C as viewed from above in the aforementioned Example, but the speaker system for the mobile object may be installed with at least two speaker devices. For example, two speaker devices may be provided at the corners in the front and the rear of the vehicle C in the front-back direction respectively, or may be provided at the corners in one side or the other side in the width direction respectively.

Further, the shape of the section and the cross sectional area of the tubular members 1004A to 1004D are substantially constant as viewed from above in the aforementioned Example, but the cross sectional area of the tubular members may be substantially constant and along with that, the shape of the section of the tubular members may be variable. Further, the lengths of the tubular members 1004A and 1004B in the front side and the tubular members 1004C to 1004D in the rear side are about the same as viewed from above in the aforementioned Example, but these lengths may also be different from one another.

Further, the enclosure 1003 as the accommodating unit and the tubular member 1004 are different members as viewed from above in the aforementioned Example, but it may also be configured such that the enclosure and the tubular member are formed integrally. For example, it is mentioned for example that the accommodating unit is a single tubular shaped member, and that this tubular shaped member serves both as the enclosure and the tubular member.

Further, frequency characteristics of the sound wave emitted by the speaker unit may be set appropriately. In a case where the sound pressure of the low sound range emitted from the front surface side of the speaker unit is high, when the sound pressure of the low sound which resonates in the tubular member and is emitted from the other end is high enough, the sound pressure of the low sound may be secured even when the sound wave from the front surface side and the sound wave from the other end weaken each other. That is, in a case where the sound pressure of low sound improves sufficiently by resonance in the tubular member, the speaker unit which emits the sound wave such that the sound pressure from the low sound range to the middle and high range about the same, or the speaker unit which emits the sound wave such that the sound pressure of the low sound range becomes higher than that of the middle and high range may be used, and also a speaker unit (a tweeter) for the middle and high range may be used. Further, a shape of the speaker unit is not specifically limited, and it may be a corn type or a dome type.

Further, the sound wave is emitted from the front surface side of the speaker units 1002A and 1002B in the front side on the upper surface of the instrument panel I as viewed from above in the aforementioned Example, but the speaker unit may emit the sound wave from the front surface side of the speaker unit, for example, on the lower surface of the instrument panel I (a surface facing the driver's seat). Further, the speaker units 1002A and 1002B are provided in the instrument panel I as viewed from above, but it may also be configured such that the speaker units are provided outside the instrument panel (for example, placed on the upper surface of the instrument panel I). At this time, the tubular member may be provided running along the outside of the instrument panel I without passing through the inside.

According to this kind of configuration, when additionally installing the speaker system for the mobile object to the vehicle, it is possible to facilitate the installation.

Further, the other ends 1042 of the tubular members 1004A to 1004D open toward the corners C1 and C2 where the three surfaces intersect as viewed from above in the aforementioned Example, but the other ends may be opening toward the intersection parts (R1 to R8 illustrated in FIG. 11) where two out of the plurality of surfaces surrounding the room space of the vehicle A1 (the inner surface of the windshield W, the upper surface S1, the lower surface S1, the front surface S3, a pair of the sides S4, and the rear surface S) intersect, or may not be opening toward the intersection parts. Further, the other ends 1042 of the tubular members 1004C and 1004D in the rear side may open toward the corner C3 where the rear surface S, the upper surface S1, and the side S4 intersect. Note that an intersection part R1 is an intersection part where the front surface S3 and the lower surface S2 of the vehicle C intersect, an intersection part R2 is an intersection part where the lower surface S2 and the side S4 of the vehicle C intersect, an intersection part R3 is an intersection part where the front surface S3 and the side S4 of the vehicle C intersect, an intersection part R4 is an intersection part where the rear surface S5 and the lower surface S2 of the vehicle C intersect, an intersection part R5 is an intersection part where the rear surface S5 and the side S4 of the vehicle C intersect, an intersection part R6 is an intersection part where the front surface S3 and the upper surface S1 of the vehicle C intersect, an intersection part R7 is an intersection part where the upper surface S1 and the side S4 of the vehicle C intersect, and an intersection part R8 is an intersection part where the rear surface S5 and the upper surface S1 of the vehicle C intersect.

Further, the standing wave is formed between the corners C1 and the corners C2 which are opposed to each other in not only in the front-back direction but also in the width direction (that is obliquely) as viewed from above in the aforementioned Example, but in a case where the other end 1042 is opening toward the intersection part, the standing wave may also be formed between the intersection parts opposed to each other only in the front-back direction. In this case, concerning the standing wave having the wavelength corresponding to the interval between the intersection parts opposed to each other in the front-back direction, the node may be transferred.

Third Invention

Figure 18:
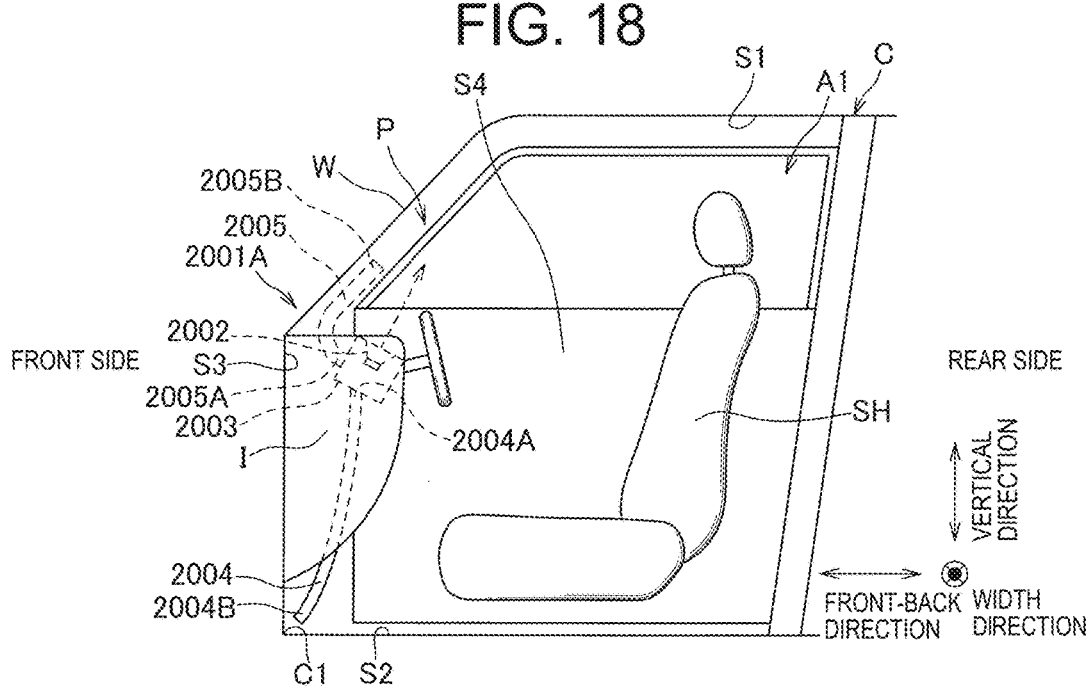
FIG. 18 is a side view illustrating a mobile object installed with a speaker system for a mobile object according to Example 4 of the present invention.
Figure 19:
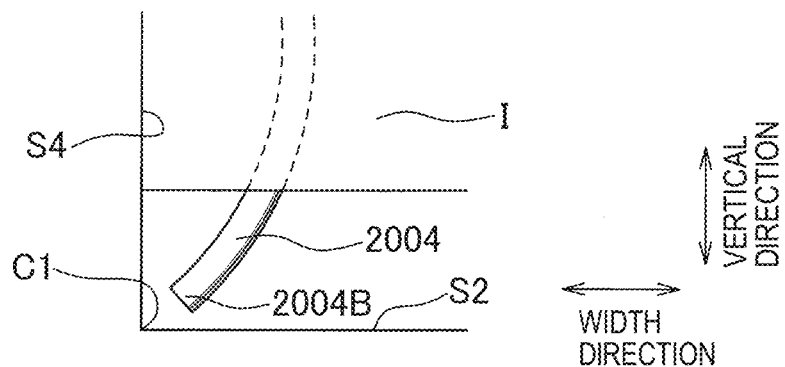
FIG. 19 is a front view illustrating a main part of the tubular member of the speaker system for the mobile object.
Figure 20:
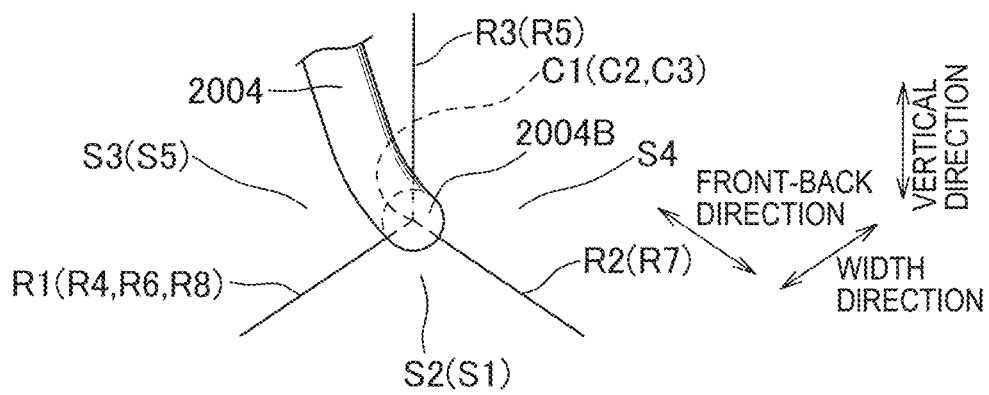
FIG. 20 is a perspective view illustrating the tubular member.
Figure 21:
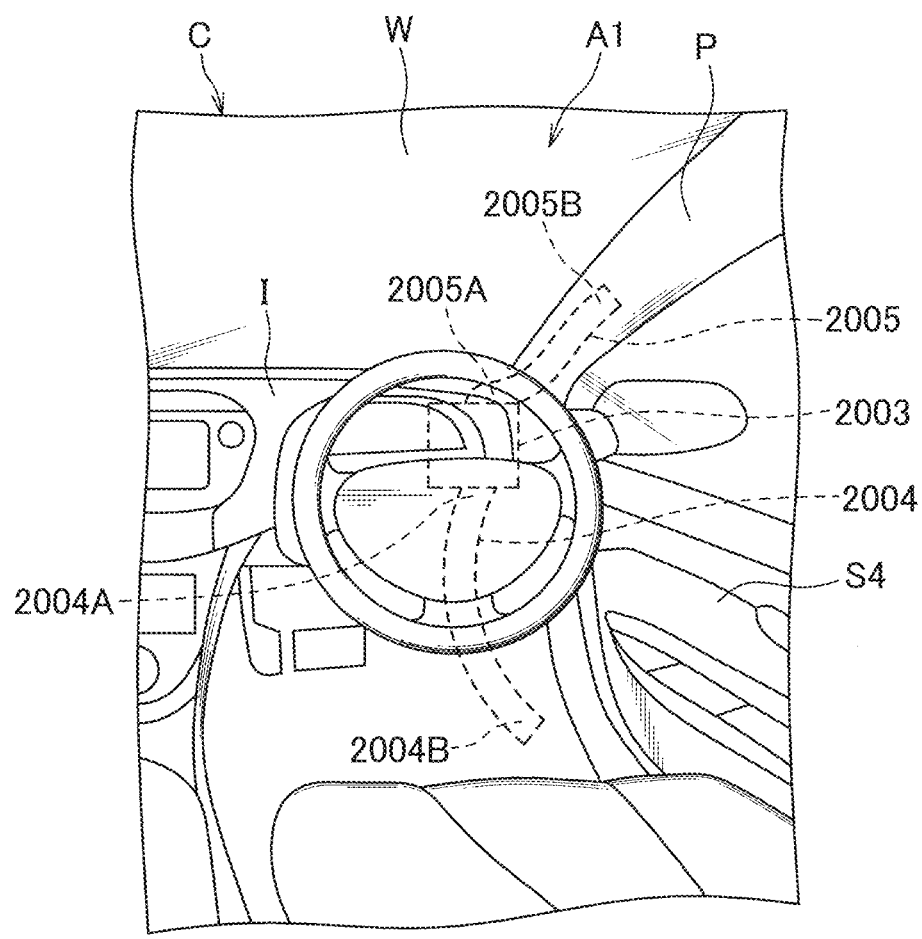
FIG. 21 is a perspective view illustrating an installed state of the speaker system for the mobile object in the mobile object.
Figure 22:
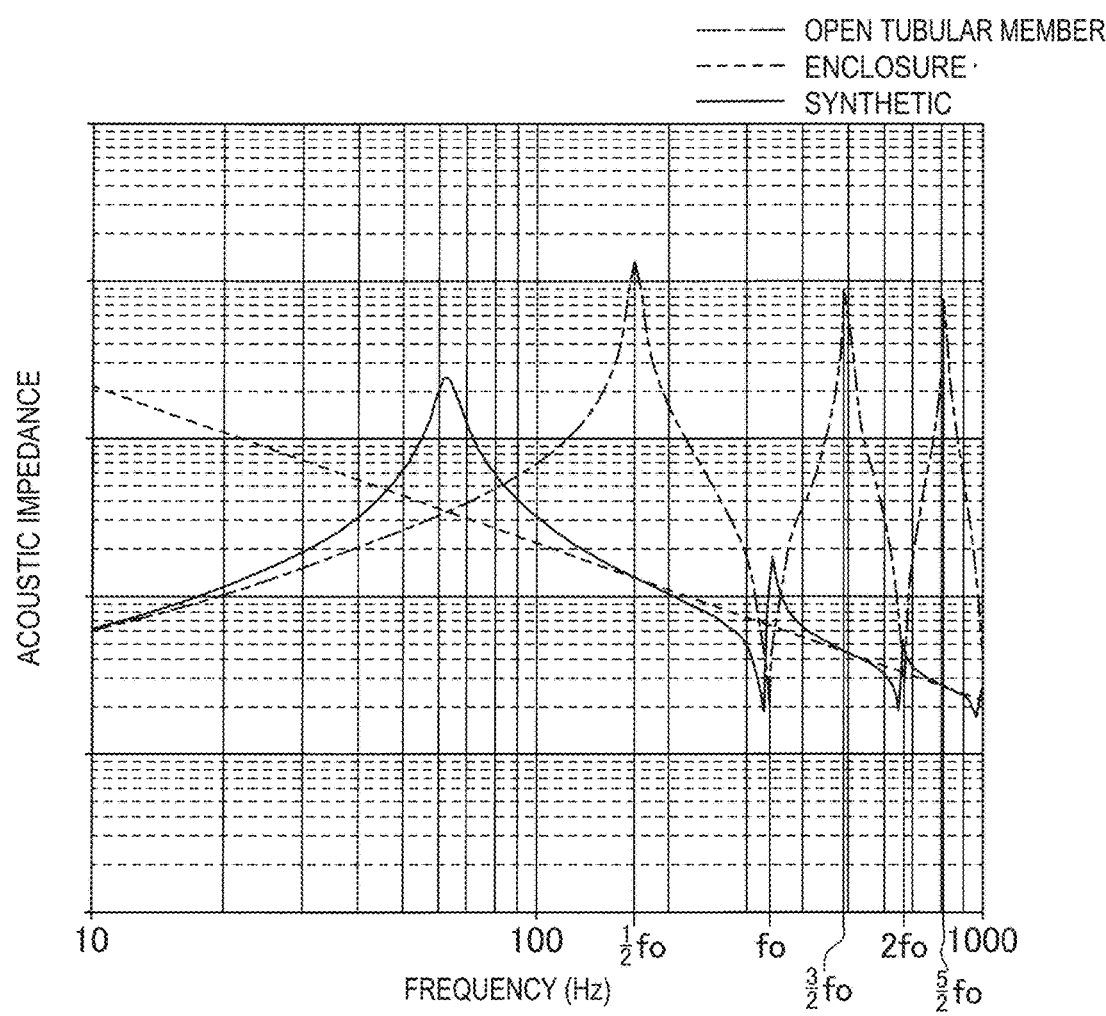
FIG. 22 is a graph showing frequency characteristics of an acoustic impedance of a speaker system for a mobile object according to a comparative example.
Figure 23:
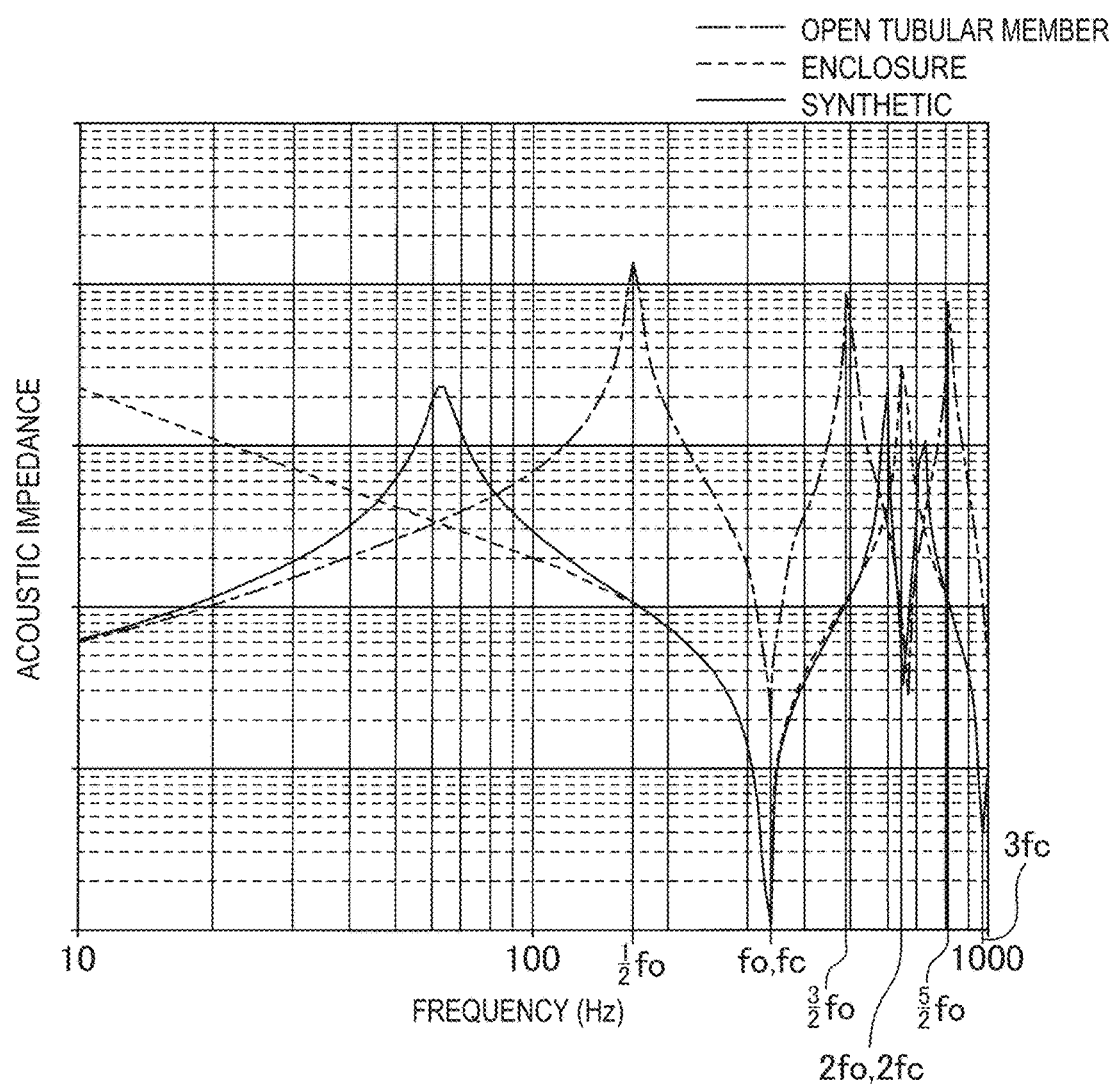
FIG. 23 is a graph showing frequency characteristics of an acoustic impedance of a speaker system for a mobile object according to an Example.
Figure 24:
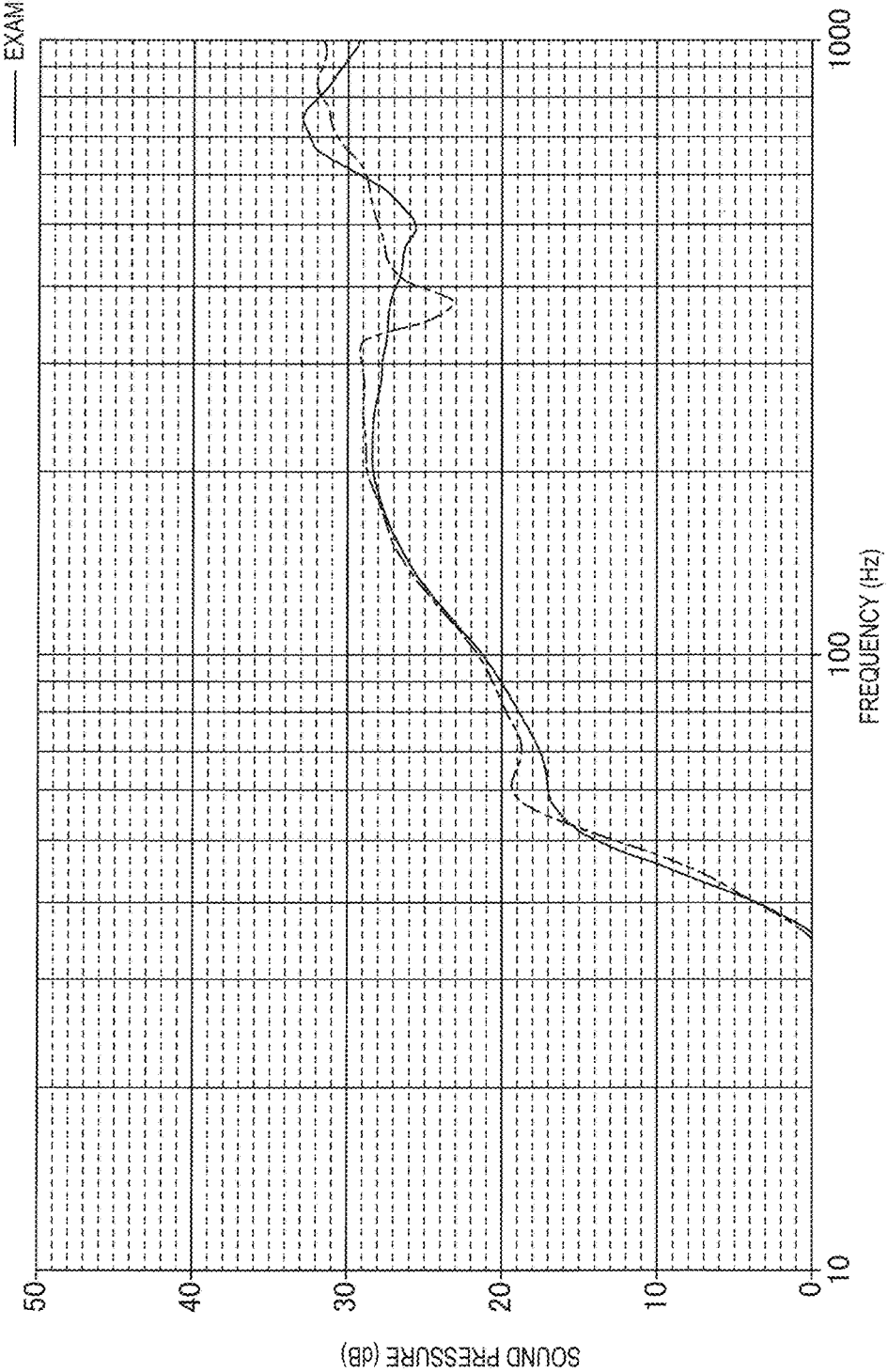
FIG. 24 is a graph showing frequency characteristics of sound pressure of a speaker system for a mobile object according to an Example and a comparative example.

Example 4 of the present invention will specifically be described below. FIG. 18 is a side view illustrating a vehicle C installed with a speaker system for a mobile object 2001A according to Example 4 of the present invention, FIG. 19 is a front view illustrating a main part of an open tubular member 2004 of the speaker system for the mobile object 2001A, FIG. 20 is a perspective view illustrating the open tubular member 2004, FIG. 21 is a perspective view illustrating an installed state of the speaker system for the mobile object 2001A in the vehicle C, FIG. 22 is a graph showing frequency characteristics of an acoustic impedance of a speaker system for a mobile object according to a comparative example, FIG. 23 is a graph showing the frequency characteristics of the acoustic impedance of the speaker system for the mobile object 2001A according to Example 4, and FIG. 24 is a graph showing the frequency characteristics of the acoustic impedance of the speaker system for the mobile object according to Example 4 and the comparative example.

As illustrated in FIG. 18, the speaker system for the mobile object 2001A provided in the vehicle C as a mobile object includes the speaker unit 2002, an enclosure 2003 as an accommodating unit accommodating the speaker unit 2002, the open tubular member (the tubular member) 2004 connected to the enclosure 2003, and a closed tubular member 2005 connected to the enclosure 2003.

The vehicle C forms a box-shaped room space of the vehicle A1 surrounded by an inner surface of a windshield W, an upper surface (a top surface) S1 and a lower surface S2 of a vehicle body, a front surface S3 in the travelling direction of the vehicle C, a pair of sides S4 (including a door body of the vehicle) facing each other in the width direction, and a not-shown rear surface in the travelling direction of the vehicle C. Further, the instrument panel I is provided on the front surface S3, and seats (a driver's seat and a passenger seat) SH are provided opposed to the rear side of the instrument panel I. In the present Example 4, let the speaker system for the mobile object 2001A be provided in the front side of the driver's seat, but may also be provided in the front side of the passenger seat, or may also be provided in both. Further, in the speaker system for the mobile object, as described in the aforementioned Examples 1 and 2, the speaker unit and the accommodating unit may be built in a door body such as a back door, a rear door and the like, and a part of the open tubular member may extend in an inner side of the door body. Even in this kind of configuration, as described later, the closed tubular member may be placed in a pillar, or the pillar may be utilized as the closed tubular member.

This speaker unit 2002 includes a vibration plate, a voice coil supported by the vibration plate, an edge which connects the vibration plate to a frame, a magnetic circuit which drives (vibrates) the voice coil, the frame which connects the voice coil to the frame, and a damper which suppresses a natural vibration of the vibration plate. The speaker unit 2002 may be a device which emits a sound wave to make the sound pressure of a middle and high sound range (for example, 1,000 Hz to 10,000 Hz) higher than that of a low sound range (for example, 10 Hz to 1,000 Hz). Further, the vibration plate is provided with a side from which the speaker unit 2002 emits the sound wave (the front surface side) facing an upper side of the vehicle C and also with the magnetic circuit side (the rear side) facing a lower part of the vehicle C. Further, the speaker unit 2002 may be provided on the instrument panel I so that a vibration direction (or a sound emission direction) of the vibration plate of the speaker unit 2002 inclines at a predetermined degree (for example, 30 degrees) against the upper surface of the instrument panel I. Note that in a case where the speaker unit is installed in the instrument panel in a state where the vibration plate is inclined against the upper side of the instrument panel I, an angle of inclination of the vibration plate against the upper surface of the instrument panel I may be set appropriately as necessary according to an angle of the windshield W and a distance between the speaker unit 2002 and the seat SH or the like, and in such a case, a central axis or the vibration plate of the speaker unit 2002 may not have to be inclined. In a case where not to let the central axis or the vibration plate of the speaker unit 2002 incline, the speaker unit 2002 may be installed so that the vibration plate is placed along the upper surface of the instrument panel I. Further, the central axis or the vibration plate of the speaker unit 2002 may be facing the driver's seat or the passenger seat.

The enclosure 2003 includes the upper surface, a bottom surface, and four sides, and is formed in a box-shape. The enclosure 2003 is provided in the instrument panel I, on the top surface of which a frame to support the vibration plate is installed, and has the speaker unit 2002 placed in the internal space thereof formed by the bottom surface and the four sides, and thus accommodating therein a part in the back side of the speaker unit 2002. Further, the enclosure 2003 may be provided such that the top surface has an inclined surface inhibiting the sound wave emitted by the vibration plate from reflecting on a part of the enclosure 2003, and also lets the sound wave be emitted in the room space of the vehicle A1. Further, the enclosure 2003 is provided in the vicinity of the side S4 in the width direction. The speaker unit 2002 is accommodated in the enclosure 2003, thereby being provided in the instrument panel I to emit the sound wave from the front side on the upper surface of the instrument panel I. Further, the sound wave generated at the back side of the speaker units 2002 is emitted toward the internal space the enclosure 2003.

The tubular member 2004 is formed in a cylindrical shape having both its ends opened, is made of a known metal, resin or the like, and is placed in a foot part of the driver's seat (the vicinity of an accelerator pedal) such that one end 2004A is linked to the lower surface of the enclosure 2003 as the back side of the speaker units 2002. A shape of a section and a cross sectional area of the open tubular member 2004 are substantially constant from the one end 2004A side to the other end 2004B side, and as described later, a length of which is formed such that the open tubular member 2004 includes resonance frequency (for example, 30 Hz to 100 Hz) corresponding to a standing wave formed in the room space of the vehicle A1. One end 2004A of the open tubular member 2004 is linked to the bottom surface of the enclosure 2003, thereby connecting the open tubular member 2004 with the internal space of the enclosure 2003 at the one end 2004A. Further, as illustrated in FIGS. 19 and 20, the other end 2004B is opening toward the room space of the vehicle A1, facing the corner C1 where the front surface S3, the lower surface S2, and the side S4 in the driver's seat side intersect at the lower part of the instrument panel I.

The open tubular member 2004 passes through the instrument panel I on the one end 2004A side, and is protruding to the outside of the instrument panel I on the other end 2004B side. Further, from the one end 2004A to the other end 2004B in the width direction, the open tubular member extends to get apart once from the side S4 in the driver's seat side, and then extends as to come near the side S4 again. That is, when being looked at in the front-back direction (the travelling direction of the vehicle C), the open tubular member 2004 has a bending shape which is bulging out convexly toward the passenger seat side. Further, the open tubular member 2004 extends so as to be directed toward the front side as approaching to the other end 2004B from the one end 2004A in the front-back direction.

The closed tubular member 2005 made of an appropriate metal, resin or the like, having one end 2005A opened and also the other end 2005A closed, is formed in a cylindrical shape, and the one end 2005A is linked to a surface facing the front side in the travelling direction of the vehicle C out of the sides of the enclosure 2003, and along with that, is placed inside a pillar P of the vehicle C. A shape of a section and a cross sectional area of the closed tubular member 2005 are substantially constant from the one end 2005A side to the other end 2005B side. A length of the closed tubular member 2005 is, as described later, approximately half of a length of the open tubular member 2004 and the closed tubular member 2005 in consideration of an open end correction. Note that when the standing wave is formed in the open tubular member 2004 and the closed tubular member 2005, its opening becomes free end so as to be antinode, which is located slightly outer side than an opening end, and a deviation of a location of the end and that of the antinode is called the open end correction. The one end 2005A of the closed tubular member 2005 is linked to the front surface of the enclosure 2003, thereby connecting the closed tubular member 2005 with the internal space of the enclosure 2003 at the one end 2005A. The closed tubular member 2005 extends from the one end 2005A toward the side S4 (that is, the door body) side in the driver's seat side passing through the inside of instrument panel I, goes into inside the pillar P, and also, extends along the pillar P. Thus, it is possible to plan to downsize the enclosure 2003, utilizing the internal space inside the pillar P.

An advance and a reflection of the sound wave when the speaker unit 2002 emits the sound wave in the above mentioned speaker system for the mobile object 2001A will be described. First, the sound wave emitted from the front surface side of the speaker unit 2002 to a diagonal rear side corresponding to an inclination of the vibration plate, and heads to the vicinity of a headrest of the driver's seat (a head part of the driver). Note that the sound wave emitted from the front surface side may be reflected on the windshield W and the upper surface (the top surface) S1 and head to the headrest.

The sound wave generated at the back side of the speaker unit 2002 echoes in the internal space of the enclosure 2003, and along with that, enters the inside of the open tubular member 2004 from the one end 2004A, and advances in the open tubular member 2004. At this time, a component of a low sound range corresponding to the length of the open tubular member 2004 and the closed tubular member 2005 among the sound waves generated at the back side of the speaker unit 2002 resonates in the open tubular member 2004. Therefore, the sound wave constituted mainly of the component of the low sound range is emitted from the other end 2004B of the open tubular member 2004. In other words, a component of a middle and high sound range of the sound wave emitted from the other end 2004B of the open tubular member 2004 has been cut. Specifically, "being cut" means that the sound pressure of the component of the middle and high sound range becomes lower than that of the component of the low range. The sound wave emitted from the other end 2004B is reflected on the corner C1 and the surrounding surfaces S1 to S4, advances toward an opposed corner opposed to the corner C1 (a corner where the upper surface S1, the rear surface, and the side of the passenger seat side intersect), is reflected again on the opposed corner and its surrounding, and advances toward the corner C1. Thus, the standing wave having a wavelength which corresponds to a distance between the corner C1 and the opposed corner is formed by the sound wave heading to the opposed corner from the corner C1 and the sound wave heading to the corner C1 from the opposed corner. The frequency of the standing wave and a resonance frequency of the open tubular member 2004 almost correspond, and the low sound amplified by the open tubular member 2004 and emitted from the other end 2004B forms the standing wave in the room space of the vehicle A1. As described above, since the open tubular member 2004 has the resonance frequency corresponding to the standing wave formed in the room space of the vehicle A1, a component resonated among the sound waves emitted from the other end 4B forms the standing wave.

Further, the sound wave which was generated at the back side of the speaker unit 2002 and echoed in the internal space of the enclosure 2003 also goes into the inside of the closed tubular member 2005 from the one end 2005A. The sound wave which went into the inside of the closed tubular member 2005 from the one end 2004A advances toward the other end 2005B side, develops a fixed end reflection on the closed other end 2004B, and advances to the one end 2005A. Therefore, a travelling wave heading to the other end 2005B and a reflected wave heading to the one end 2005A strengthen each other and weaken each other.

The sound wave is emitted as mentioned above, thereby echoing the sound wave having the component constituted mainly of the middle and high sound range emitted from the front surface side of the speaker unit 2002 and the sound wave constituted mainly of the component of the low sound range emitted from the other end 2004B of the open tubular member 2004 in the room space of the vehicle A1.

Here, the acoustic characteristics of the speaker system for the mobile object 1A in Example 4 will be described specifically below referring also to a speaker system for a mobile object of a comparative example. First, phase characteristics of an acoustic impedance are obtained by a simulation, concerning the comparative example and the speaker system for the mobile object in Example 4. At this time, conditions of calculation are as follows. That is, in the speaker system for the mobile object as viewed from above in the comparative example, the speaker unit is accommodated in the box-shaped enclosure having a capacity (volume of the internal space) of one liter thereof, and on the enclosure, the open tubular member of the length of 500 mm on which the open end correction is considered is connected to the side opposed to the back side of the speaker unit and the closed tubular member is not provided therein. On the other hand, in the speaker system for the mobile object 2001A as viewed from Example 4, the open tubular member 2004 having the length of 500 mm on which the open end correction is considered and the closed tubular member 2005 having the length of 250 mm with the capacity of one liter are connected, and this connecting part accommodates the speaker unit functioning as an enclosure, and a capacity of the enclosure 2003 is small enough.

In the speaker system for the mobile object in the comparative example, the frequency-dependency of the acoustic impedance as illustrated in FIG. 22 was obtained. A horizontal axis in FIG. 22 indicates a frequency displayed logarithmically, and a vertical axis indicates the acoustic impedance displayed logarithmically. As illustrated with a broken line, the acoustic impedance only of the enclosure monotonically decreased along with an increase of the frequency. On the other hand, as illustrated with a dashed line, the acoustic impedance of the open tubular member alone, indicates the minimum value on an integral multiple of n times (n≥1) of a frequency fo (about 340 Hz) of a fundamental vibration in the natural vibration, and the maximum value was indicated in −fo/2+nfo. That is, the maximum value and the minimum value were repeatedly indicated in every fo/2.

A synthetic acoustic impedance (the acoustic impedance of the entire speaker system for the mobile object) of the enclosure and the open tubular member in the comparative example indicated, as shown with a solid line, the maximum value at about 61 Hz, the minimum value at about 320 Hz, the maximum value at about 340 Hz, and then the minimum value and the maximum value repeatedly. Further, it is considered that the maximum value at about 61 Hz is caused by the maximum value at fo/2 of the open tubular member, the minimum value at about 320 Hz is caused by the minimum value at fo of the open tubular member, and the maximum value at about 340 Hz is caused by the maximum value at 3 fo/2 of the open tubular member.

In the speaker system for the mobile object in example 4, the frequency-dependency of the acoustic impedance as illustrated in FIG. 23 was obtained. The horizontal axis and the vertical axis in FIG. 23 are the same as the ones in FIG. 22. As illustrated with a dashed line, the acoustic impedance of the closed tubular member alone indicates the minimum value at an odd number k times (k≥1) of a frequency fc (about 340 Hz) of the fundamental vibration in the natural vibration and the maximum value was indicated at an even number m times (m≥2) of the fc. That is, the maximum value and the minimum value were repeatedly indicated in every fc. The acoustic impedance of the open tubular member became the same as that of the comparative example.

In the speaker system for the mobile object in Example 4, the frequency fo of the fundamental vibration in the open tubular member and the frequency fc of the fundamental vibration of the closed tubular member became almost the same. Further, the frequency 2 fo of a double vibration of the open tubular member became almost the same as the intermediate frequency 2 fc between the fundamental vibration of the closed tubular member and a triple vibration. That is, at the frequency 2 fo (2 fc), the acoustic impedance of the open tubular member indicated the maximum value, and the acoustic impedance of the closed tubular member indicated the minimum value.

Since the acoustic impedance of the closed tubular member showed the aforementioned characteristics, the synthetic acoustic impedance in Example 4 showed different characteristics from the synthetic acoustic impedance in the comparative example as shown with a solid line. That is, the synthetic acoustic impedance in Example 4 indicated the maximum value at about 61 Hz, the minimum value at about 340 Hz (fo, fc), the maximum value at about 600 Hz, the minimum value at about 680 Hz, the maximum value at about 740 Hz, and then the minimum value and the maximum value repeatedly. Further, it is considered that the maximum value at about 61 Hz is caused by the maximum value at fo/2 of the open tubular member, the minimum value at about 340 Hz is caused by the minimum value at fo and fc of the open tubular member and the closed tubular member, the maximum value at about 600 Hz is caused by the maximum value at 3 fo/2 of the open tubular member and the maximum value at 2 fc of the closed tubular member, the minimum value at about 680 Hz is caused by the minimum value at 2 fo of the open tubular member, the maximum value at about 740 Hz is caused by the maximum value at 5 fo/2 of the open tubular member and the maximum value at 2 fc of the closed tubular member.

It is considered that in the synthetic acoustic impedance of Example 4, since the maximum value and the minimum value overlap at the frequency 2 fo (2 fc), the maximum value at about 340 Hz of the synthetic acoustic impedance of the comparative example shifted to a high-frequency side.

The frequency characteristics (sound pressure characteristics) of the sound pressure of the speaker system for the mobile object in Example 4 and the comparative example are shown in FIG. 24. Concerning the sound pressure characteristics of the speaker system for the mobile object in the comparative example, the minimum value was indicated at about 380 Hz as illustrated with a dashed line. It is considered that this is caused by the maximum value at about 340 Hz of the synthetic acoustic impedance. On the other hand, since the maximum value at about 340 Hz as the comparative example of the synthetics acoustic impedance is shifted to the high-frequency side, the sound pressure characteristics of the speaker system for the mobile object in example 4 did not indicate the minimum value at around 380 Hz, but gradually changed.

Therefore, since the closed tubular member is provided and along with that the length is set as mentioned above, it is possible to inhibit the sound pressure from decreasing at a specific frequency in the speaker system for the mobile object in Example 4. Further, in the speaker system for the mobile object in the comparative example, when attempting to inhibit the sound pressure around 380 Hz from decreasing, it is necessary to correct an input signal to the speaker unit, while in the speaker system for the mobile object in Example 4, the sound pressure hardly changes around 380 Hz, and without correcting the input signal, it is possible to obtain good acoustic characteristics.

According to the above configuration, since the one end 2005A of the closed tubular member 2005 is connected to the enclosure 2003 accommodating the back side of the speaker unit 2002, not only the capacity of the enclosure 2003, but also a capacity of the closed tubular member 2005 can be utilized as a capacity of the speaker unit 2002 on the back side, and it is possible to downsize the enclosure 2003 while securing the capacity on the back side of the speaker unit 2002. At this time, the closed tubular member 2005 has high flexibility in installation, and the other end 2005B side is provided in the pillar, thereby utilizing a free space in the mobile object C effectively. By downsizing the enclosure 2003, and along with that, by placing the closed tubular member 2005 utilizing the free space, the speaker system for the mobile object 2001A may be easily provided on the mobile object C.

Further, since the other end 2004B of the open tubular member 2004 is opening toward the corner C1 where three of a plurality of surfaces surrounding the room space of the vehicle A1, a low pitched sound emitted from the other end 2004B reflects on the three surfaces and easily echoes in the room space of the vehicle A1, thereby improving the acoustic characteristics of the low sound range in the speaker system for the mobile object 2001A.

Further, in a case where the speaker unit 2002 emits a sound wave such that the sound pressure of the middle and high sound range becomes higher than that of the low sound range, it is possible to reduce amplitude of the voice coil or the vibration plate of the speaker unit 2002, and thus it is also possible to inhibit an allophone from being generated that is resulted from the vibration transmitted to the vehicle body. Further, as described above, the acoustic characteristics of the low sound range are improved, thereby obtaining the good acoustic characteristics even when a small speaker unit 2002 in which the sound pressure of the low sound range is low is utilized. Further, since the sound pressure of the low sound emitted from the front side of the speaker unit 2002 is relatively low, the sound wave emitted from the front side of the speaker unit 2002 and the sound wave emitted from the other end 2004B of the open tubular member 2004 do not weaken each other easily in the low sound range.

In the speaker system for the mobile object 2001A, mainly the sound pressure of the middle and high sound range is emitted from the front surface of the speaker unit 2002, and mainly the sound pressure of the low sound range is emitted from the other end 2004B of the open tubular member 2004. While there is a case where the most appropriate emission point of the middle and high sound range, and the low sound range differ, an emission point of the middle and high sound range and an emission point of the sound wave of the low sound range are apart, thereby placing each of them at the most appropriate position, and thus it is possible to obtain the extremely good acoustic characteristics.

Further, since the other end 2004B of the open tubular member 2004 is opening toward the corner C1, the standing wave is formed between the corner C1 and the opposed corner by the sound wave emitted from the other end 2004B. At this time, since a distance between the corner C1 and the opposed corner is longer than a distance between a pair of surfaces opposed to each other (the upper surface S1 and the bottom surface S2, the front surface S3 and the rear surface, and a pair of sides S4), it is possible to form the standing wave having a long wavelength, and also it is possible to echo the low sound effectively in the room space of the vehicle A1.

Further, the speaker unit 2002 and the enclosures 2003 are provided in the instrument panel I, and along with that, the open tubular members 2004 passes through the inside of the instrument panel I, thereby keeping an appearance good in a case where the speaker system for the mobile object 2001A is provided in the vehicle C.

Note that the present invention is not limited to the aforementioned Examples 4, the invention includes other configurations which can achieve the object of the invention, and the following modifications are also included in the invention.

Figure 25A:
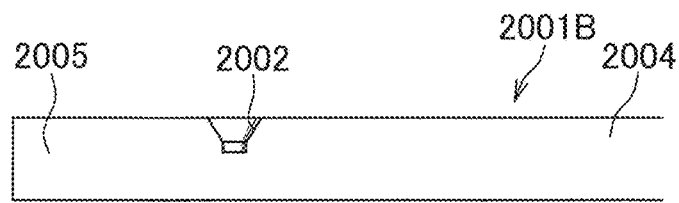
FIG. 25 is a side view illustrating a speaker system for a mobile object according to Modification Examples 5 to 7 of the present invention.

For example, as viewed from above in the aforementioned example, the open tubular member 2004 and the closed tubular member 2005 are connected to the box-shaped enclosure 2003, but the enclosure and the open tubular member or the closed tubular member may be formed integrally. For example, the open tubular member and the closed tubular member may be formed by a single tubular shaped member, and the speaker unit may be accommodated in a part of the tubular shaped member (an interstitial part). Further, as illustrated in FIG. 25A with a fifth modification, a speaker system for a mobile object 1B may have the speaker unit 2002 accommodated in the single tubular shaped member having one end opened and the other end closed. Viewed from the speaker unit 2002, in a speaker system for a mobile object 2001B, the open tubular member 2004 is located in an open end side (right side in the diagram), the closed tubular member 2005 is located in a closed end side (left side in the diagram), and a boundary part between the open tubular member 2004 and the closed tubular member 2005 is the accommodating unit. That is, the open tubular member 2004, the closed tubular member 2005, and the accommodating unit are formed integrally, in a single tubular shape. According to this kind of configuration, it is possible to reduce the number of parts comparing with a configuration such that the accommodating unit and the open tubular member or the closed tubular member are formed separately.

Figure 25B:
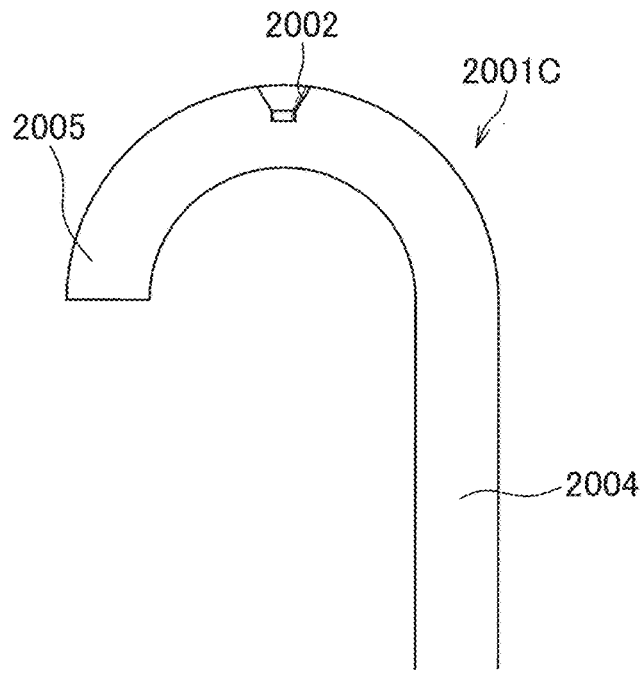

Further, as illustrated in FIG. 25B as a sixth modification, the curved single tubular shaped member in which the open tubular member 2004, the closed tubular member 2005 and the accommodating unit are integrated may be referred to as a speaker system for a mobile object 2001C. Further, let the speaker system for the mobile object 2001C be curved in a J-shape so that the accommodating unit, the open end, and the closed end extend in the same direction, but a curved position, a direction and an angle or the like may be set appropriately. Thus, the single tubular shaped member is curved, thereby improving flexibility in installation to the vehicle even more.

Figure 25C:
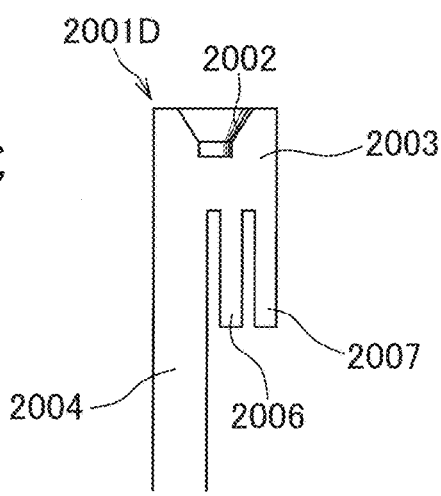

Further, as viewed from above in the aforementioned Example, a single closed tubular member 2005 is connected to the enclosure 2003, but the configuration may also be such that a plurality of the closed tubular members are connected to the enclosure 2003. For example, as illustrated in FIG. 25C as a seventh modification, a speaker system for a mobile object 2001D may have two closed tubular members 2006 and 2007 connected to the enclosure 2003. According to this kind of configuration, it is possible to utilize a capacity of both of the two closed tubular members 2006 and 2007 as a capacity of the back side of the speaker unit 2002. Therefore, in the vehicle, when there is a small free space at two places each, it is possible to provide both of the closed tubular members 2006 and 2007 in each even when there is no big free space at one place, and thus it is possible to improve flexibility in installation to the vehicle even more while securing the capacity of the back side of the speaker unit 2002.

Further, the speaker unit 2002 and the enclosure 2003 are provided in the instrument panel I as viewed from above in the aforementioned example, but the speaker unit 2002 and the enclosure 2003 may also be provided in other places.

Figure 26A:
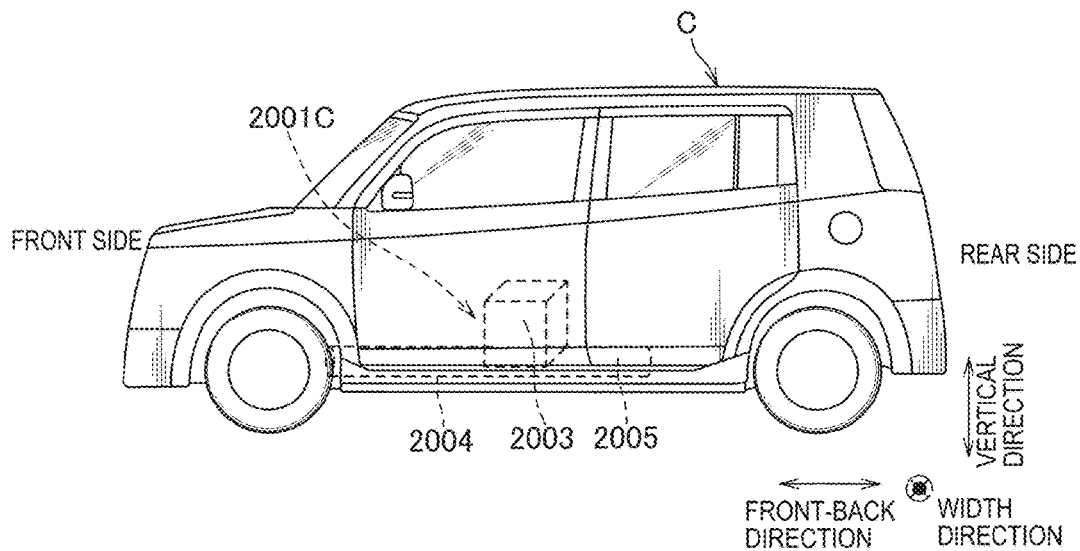
FIG. 26A is a side view illustrating a speaker system for a mobile object according to Modification Example 8 of the present invention.
Figure 26B:
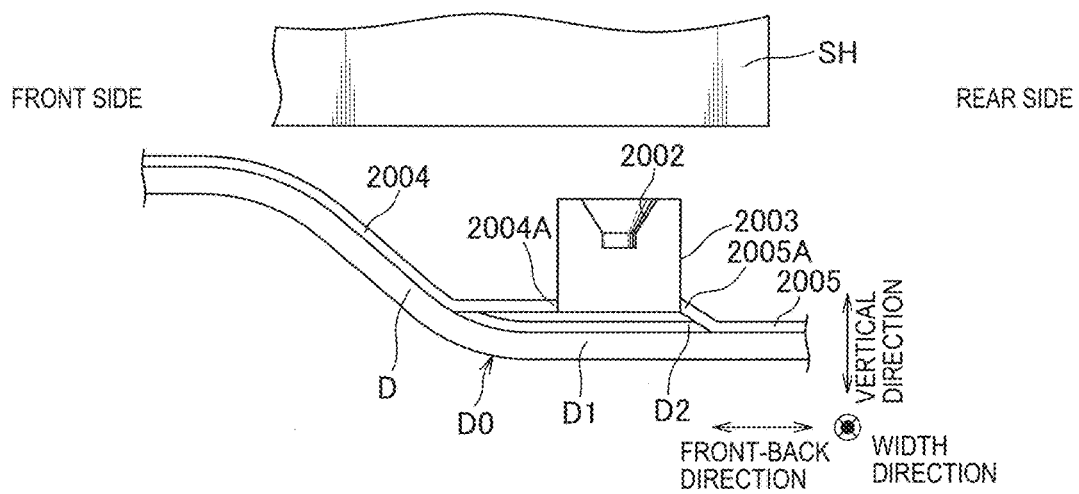
FIG. 26B is a side view illustrating a speaker system for a mobile object according to Modification Example 8 of the present invention.
Figure 26C:
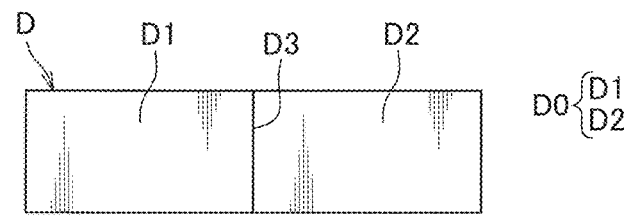
FIG. 26C is a side view illustrating a speaker system for a mobile object according to Modification Example 8 of the present invention.

For example, as illustrated in FIG. 26A, 26B and 26C as an eighth modification, a speaker system for a mobile object 2001E may have the speaker unit 2002 and the enclosure 2003 provided at the lower part of the seat SH of the vehicle C. An air-conditioning duct D is provided in the vehicle C installed with the speaker system for the mobile object 2001E. The air-conditioning duct D extends along in the front-back direction in order to send cold air or warm air from an air conditioner provided in the front side (for example, in the instrument panel I) to a foot part of a back seat, and as illustrated in FIG. 26C, includes a passage part D0. The passage part D0 includes a first passage D1 where the cold air or the warm air pass through, and a second passage D2 by being divided by a partition portion D3. The second passage D2 is provided, for example, for reinforcing the first passage D1.

The open tubular member 2004 of the speaker system for the mobile object 2001E extends toward the front side of the one end 2004A connected to the front surface of the enclosure 2003, is connected to the second passage D2, extends toward the front side with the second passage D2 functioning as the open tubular member, becomes separate from the second passage D2 on the one end side, and opens toward an intersection part of the front side the corner. That is, a portion between the one end 2004A of the open tubular member 2004 and the other end, and the air-conditioning duct D are formed integrally. Further, the closed tubular member 2005 has the one end 2005A connected to the rear side of the enclosure 2003, extends toward the rear side, is being connected to the second passage D2 independently from the open tubular member 2004, the second passage D2 of which functions as the closed tubular member and extends toward the rear side, and the not-shown other end of which is closed. Note that, the configuration may be such that the second passage D2 is not formed in the air-conditioning duct D, and a portion of the open tubular member 2004 and the closed tubular member 2005 and the first passage D1 are formed integrally.

According to the speaker system for the mobile object 2001A in the eighth modification, it is possible to reduce a cost by utilizing the air-conditioning duct D as the open tubular member 2004 and the closed tubular member 2005, and also, to utilize the space formed in the vehicle C in order to let the air-conditioning duct D pass through. Further, even when an installation space for the speaker unit 2002 at the lower part of the seat SH is small, the other end of the open tubular member 2004 is facing toward the corner or the intersection part, thereby improving the acoustic characteristics of the sound pressure of the low sound range or the like.

Figure 27A:
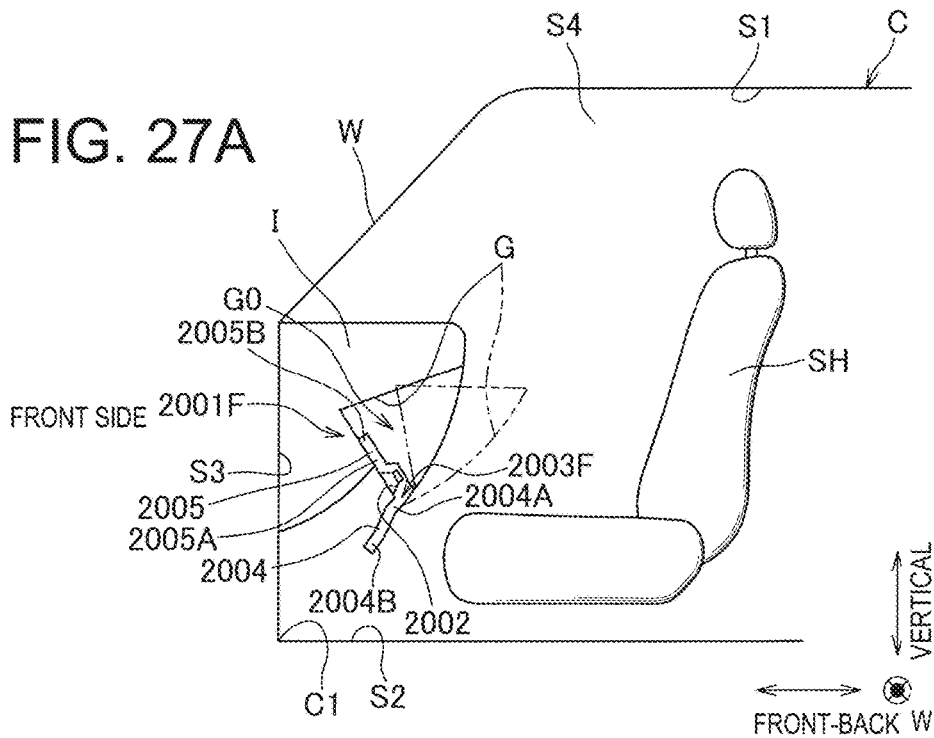
FIG. 27A is a side view illustrating a speaker system for a mobile object according to Modification Example 9 of the present invention.

Further, as illustrated in FIG. 27A as a ninth modification, a speaker system for a mobile object 2001F may be such that the speaker unit 2002 and an enclosure 2003F are formed as a part of a glove compartment G as a box part provided in the instrument panel I of the vehicle C. A rotary shaft is provided in the instrument panel I of the vehicle C installed with the speaker system for the mobile object 2001F along the width direction, and the glove compartment G is provided such that an internal part is openable and closable (illustrated with a two-dot chain line) by rotating in a rotating direction of the rotary shaft. A space at the lower side of the glove compartment G is partitioned from the other portion G0 (a space capable of accommodating an accommodated article), thereby forming the enclosure 2003F. The speaker unit 2002 is accommodated in the enclosure 2003F with the front surface facing the outside of the glove compartment G, and also with the front surface facing the front side and the lower side. In the open tubular member 2004, the one end 2004A is connected to the lower side of the enclosure 2003F, and the other end 2004B opens toward the corner C1. The closed tubular member 2005 is accommodated in the glove compartment G with the one end 2005A connected to, for example, the upper side and the front side in the vehicle C, of the enclosure 2003F.

Figure 27B:
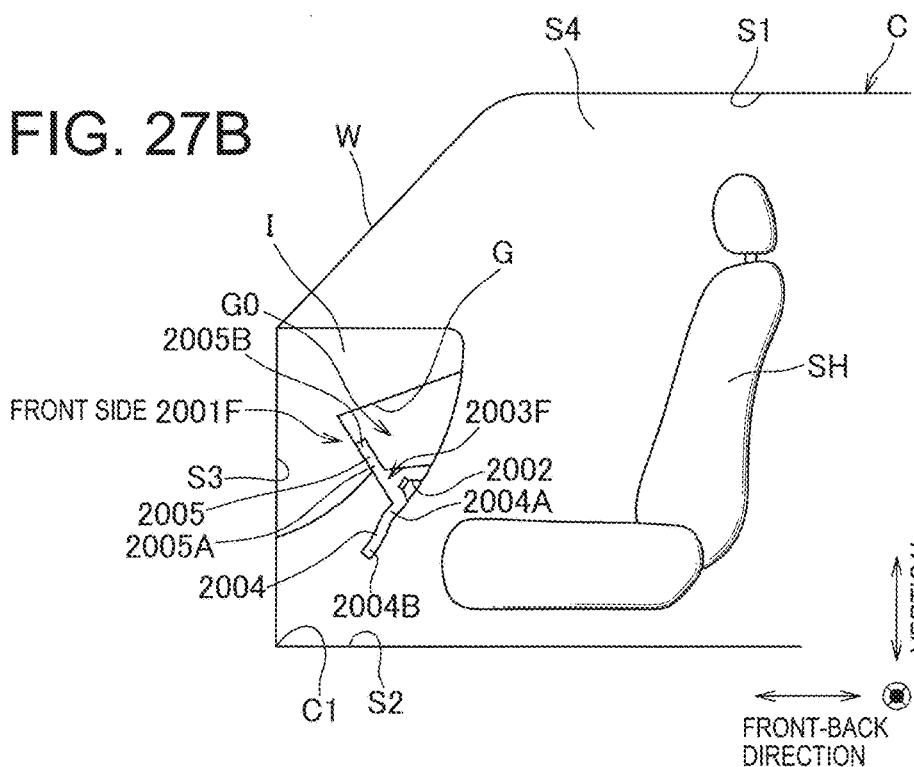
FIG. 27B is a side view illustrating a speaker system for a mobile object according to Modification Example 9 of the present invention.

Note that the other end 2004B of the open tubular member 2004 may open toward the intersection part where the front surface S3 and the lower surface S2 intersect. Further, as illustrated in FIG. 27B, the front surface of the speaker unit 2002 may face to the rear side in the travelling direction of the vehicle C. Further, the enclosure 2003F may be formed in the existing glove compartment G installed in the vehicle C and the speaker unit 2002 may be accommodated therein, or the glove compartment G which is provided with the speaker system for the mobile object 2001F beforehand may also be manufactured. Further, it may also be configured such that a closed space or a sealed space which is formed when the glove compartment G is not partitioned into a plurality of spaces and is closed functions as the enclosure. Further, the closed tubular member 2005 may be connected to an appropriate location of the enclosure 2003F and along with that, may extend in an appropriate direction.

According to the speaker system for the mobile object 2001F in the ninth modification, the enclosure 2003F is a part of the glove compartment G, thereby directing the other end of the open tubular member 2004 easily to the corner C1. Further, even when the speaker unit 2002 is downsized to inhibit the space in the glove compartment G from getting smaller, the open tubular member 2004 and the other end 2004B open toward the corner C1 or the intersection part, thereby improving the acoustic characteristics of the sound pressure of the low sound range or the like. Further, the closed tubular member 2005 may be placed outside the glove compartment G, and according to this kind of configuration, it is possible to secure the capacity in the back side of the speaker unit 2002, and at the same time, to inhibit the space in the glove compartment G from getting smaller.

Figure 28:
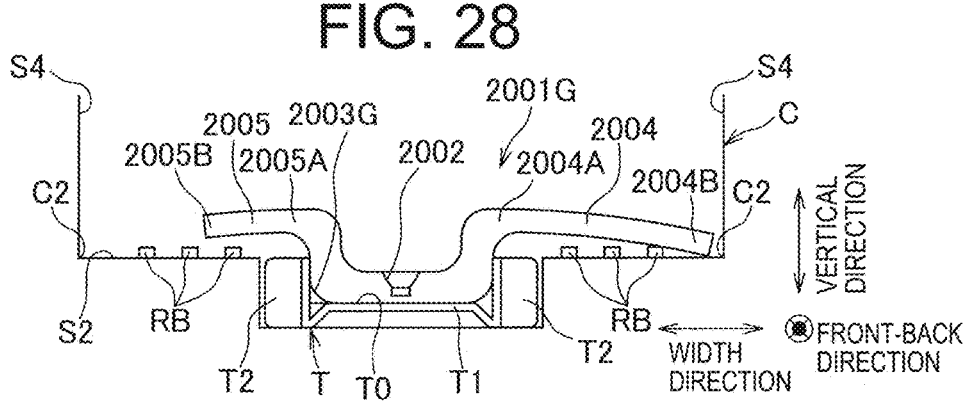
FIG. 28 is a rear view illustrating a speaker system for a mobile object according to Modification Example 10 of the present invention.

Further, as illustrated as modification 10 in FIG. 28, a speaker system for a mobile object 2001G may have the speaker unit 2002 and an enclosure 2003G provided inside a wheel T1 of a spare tire T accommodated in the room space of the vehicle A1. The spare tire T, for example, is accommodated in a tire accommodating unit formed in the rear side in the travelling direction of the vehicle C, and includes the wheel T1 and a tire T2. A concave portion T0 is formed on a surface facing an inner side in the width direction when used to be installed to the vehicle C, in the wheel T1. An inner peripheral surface of the concave portion T0 is formed in a cylindrical shape and the enclosure 2003G is formed in a cylindrical shape and an outer peripheral dimension of which is about the same or slightly smaller size than the concave portion. The enclosure 2003G is accommodated in the concave portion T0.

Further, a height of the enclosure 2003G is larger than a depth of the concave portion T0, an portion of the enclosure 2003G (the lower part) is accommodated in the concave portion T0, and the other portion (an upper portion) is protruding from the concave portion T0. Note that, in a vertical direction of the vehicle C, it may also be configured such that the entire enclosure 2003G is accommodated in the concave portion T0. Each of the one end 2004A of the open tubular member 2004 and the one end 2005A of the closed tubular member 2005 are connected to the enclosure 2003G. Let the other end 2004B of the open tubular member 2004 open toward the corner C2 where one of the sides S4, the lower surface S2, and the rear surface intersect in the vehicle C, but it may also open toward a corner where the side S4, the upper surface, and the rear surface intersect, or open toward a corner where the rear surface and other surfaces (the side S4, the lower surface S2 or the upper surface) intersect. The closed tubular member 2005 extends toward the other side S4 side.

Note that, on a surface of the lower surface S2 of the vehicle, a ruggedness is formed by a reinforced rib RB which extends in the front-back direction or in the width direction, and a tabular cover portion may be provided on the surface. A gap formed between the ruggedness and the cover portion may be utilized as the open tubular member or the closed tubular member.

According to the speaker system for the mobile object 2001G in the tenth modification, even when the speaker unit 2002 is downsized in order to accommodate the concave portion T0 of the spare tire T, the other end 2004B of the tubular member 2004B is opening toward the corner C2 or the intersection part, thereby improving the acoustic characteristics of the sound pressure of the low sound range or the like. Further, the closed tubular member 2005 is provided, thereby securing the capacity on the back side of the speaker unit 2002.

Figure 29A:
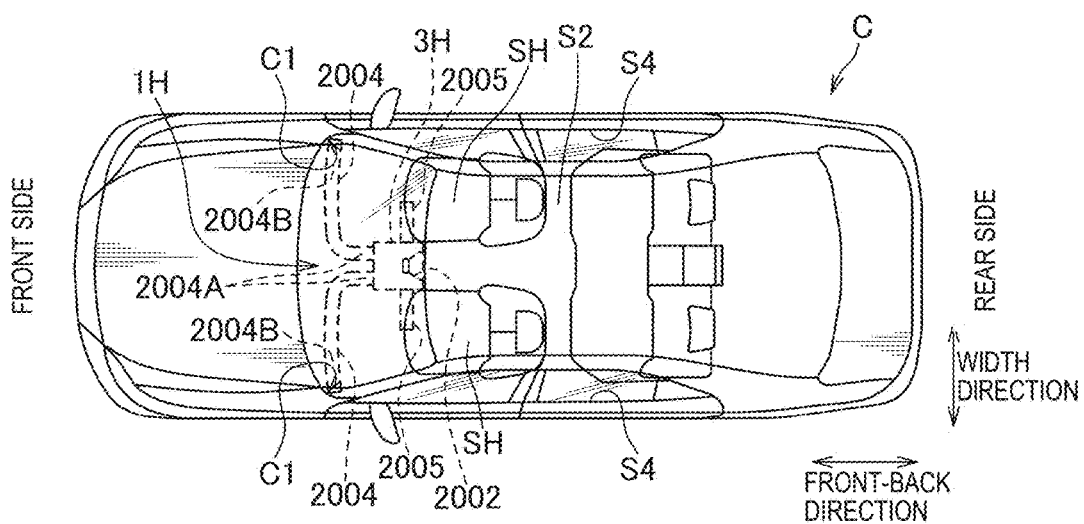
FIG. 29A is a plan view illustrating a speaker system for a mobile object according to Modification Example 11 of the present invention.

Further, as illustrated as a modification 11 in FIG. 29A, a speaker system for a mobile object 2001H may be such that the speaker unit 2002 and the enclosure 2003H are provided in the central part in the width direction. The speaker unit 2002 and the enclosure 2003H are provided between and at the lower part of the two seats SH in the front side, and the one ends 2004A of the two open tubular members 2004 are connected to the front surface of the enclosure 2003H, and along with that, the closed tubular member 2005 is connected to both sides in the width direction. One of the two open tubular members 2004 extends to a right side in the travelling direction, and the other extends to a left side, that is, the two extend toward an opposite side of each other in the width direction. Further, the other ends 2004B of the two open tubular members 2004 are opening toward the corners C1 in the right and the left respectively. Let the closed tubular member 2005 extend along the width direction, but a position where the closed tubular member 2005 is connected to the enclosure 2003H and an extending direction may be set appropriately.

Figure 29B:
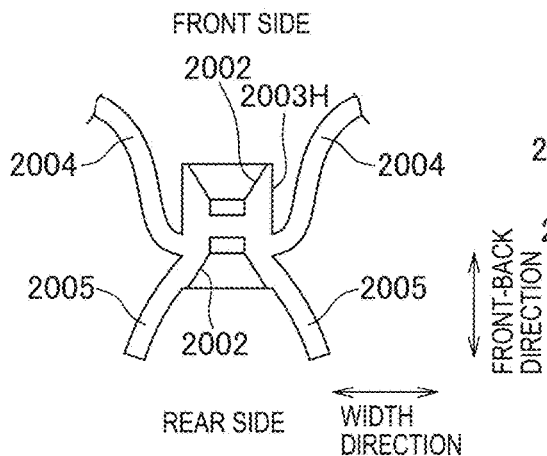
FIG. 29B is a plan view illustrating a speaker system for a mobile object according to Modification Example 11 of the present invention.
Figure 29C:
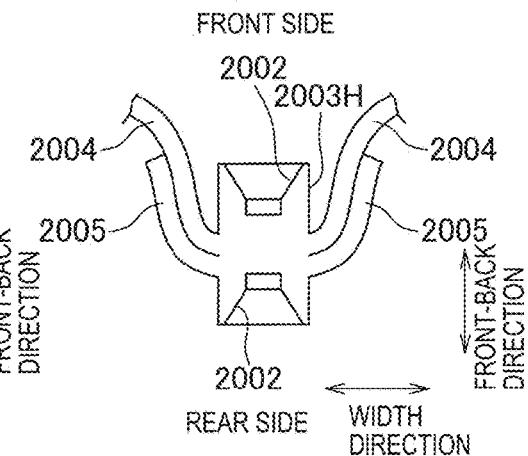
FIG. 29C is a plan view illustrating a speaker system for a mobile object according to Modification Example 11 of the present invention.

Note that, the other end 2004B of the open tubular member 2004 may open toward the corner where the side S4 and the lower surface S2 of the vehicle C intersect. Further, as illustrated in FIG. 29B, it may also be configured such that the two speaker units 2002 are accommodated in the enclosure 2003F, one speaker unit 2002 emits the sound wave to the front side, and the other speaker unit 2002 emits the sound wave to the rear side. According to this kind of configuration, it is possible to inhibit the sound waves emitted from the back side of the two speaker units 2002 from weakening each other, and also the enclosure 2003 from vibrating when emitting sound.

According to the speaker system for the mobile object 2001H in the eleventh modification, it is possible to utilize a space provided between the two seats SH in the front side and at the lower part. Further, even when an installation space in this space is small, since the other end 2004B of the open tubular member 2004 is opening toward the corner C 1 or the intersection part, it is possible to improve the acoustic characteristics of the sound pressure of the low sound range or the like. Further, the closed tubular member 2005 is provided, thereby securing the capacity on the back side of the speaker unit 2002. Further, the low sound emitted from the other end 2004B of the open tubular member 2004 echoes on both sides in the width direction, thereby making reproduced sound powerful for a passenger.

Figure 30A:
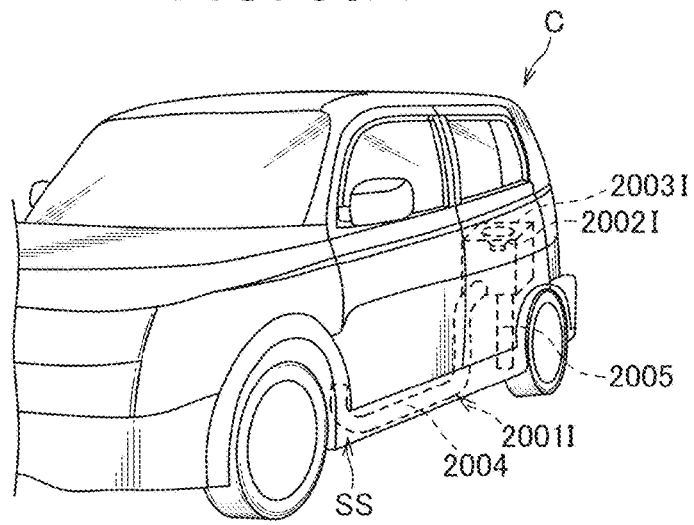
FIG. 30A is a perspective view and a side view illustrating a speaker system for a mobile object according to Modification Example 12 of the present invention.
Figure 30B:
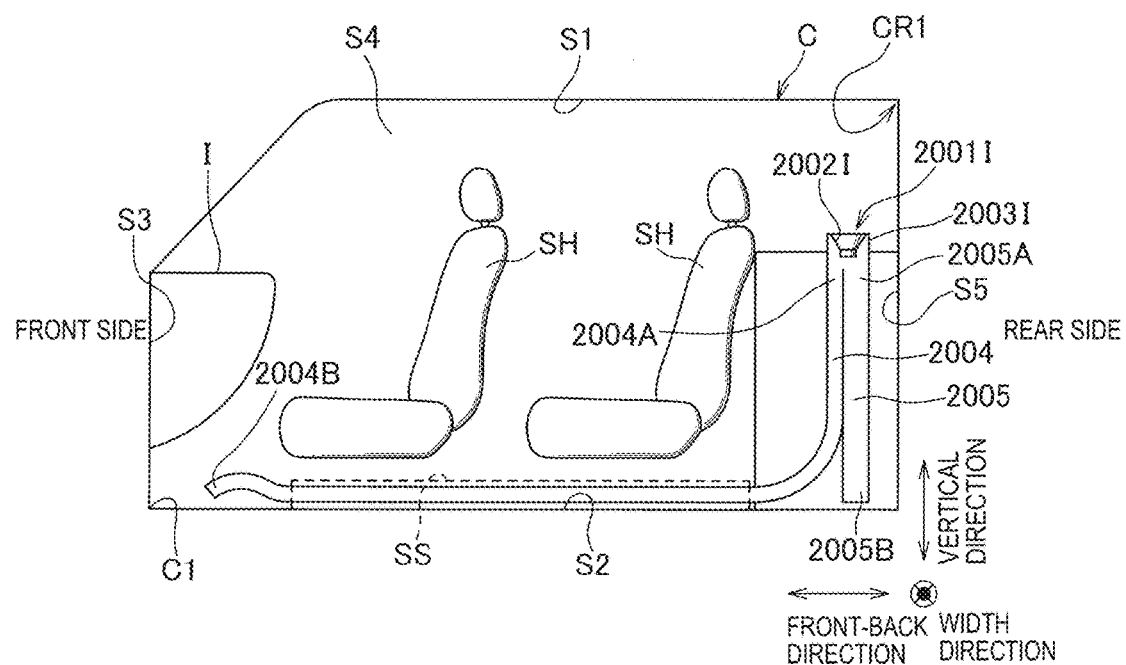
FIG. 30B is a perspective view and a side view illustrating a speaker system for a mobile object according to Modification Example 12 of the present invention.

Further, as illustrated as a modification 12 in FIG. 30, a speaker system for a mobile object 2001I may be a speaker system such that a speaker unit 2002I for reproduction of the low sound and an enclosure 2003I are provided in the rear side in the travelling direction of the vehicle C, and along with that, are provided in the vicinity of an intersection part CR1 where the upper surface S1 and the rear surface S5 of the vehicle C intersect, and the open tubular member 2004 extends toward the corner C1 in the front side passing through the inner side of the side sill SS of the vehicle C. The enclosure 2003I is provided in the rear of the headrest of the seat SH in the central part in the width direction and in the rear side, the speaker unit 2002I is accommodated therein with its front surface facing upward, and thus connecting the one end 2004B of the open tubular member 2004 and the one end 2005A of the closed tubular member 2005A to the lower surface thereof. The open tubular member 2004 extends from the lower surface of the speaker unit 2002I toward the lower part and one of the sides of the vehicle C, and extend toward the front side, passing through the inner side of the side sill SS which extends in the front-back direction at a lower part of the door body of the vehicle C. Further, the open tubular member 2004 heads to the higher side once and then heads to the lower side at the more front side than the side sill SS, thereby opening the other end 2004B toward the corner C1.

The sound wave emitted from the speaker unit 2002I heads to the intersection part CR1, and the sound wave emitted from the other end of the open tubular member 2004 heads to the corner C1. Note that it may also be configured such that the enclosure is provided either in the left or the right in the width direction, and that the sound wave emitted from the speaker unit heads to a corner where the upper surface S1, the side S4, and the rear side S5 intersect. Further, the other end 2004B of the open tubular member 2004 may be opening toward an intersection part in the more front side than the side sill SS, also may be opening toward an intersection part where the front surface S3 and the lower surface S2 intersect, or may also be facing toward an intersection part where a portion in the more front side than the side sill SS on the side S4 and the lower surface S2 intersect.

According to this kind of speaker system for the mobile object 2001I in a modification 12, the low sound emitted from the speaker unit 2002I and the other end 2004B of the open tubular member 2004 is reflected at the corner or the intersection part in the front and the rear and it is possible to improve the acoustic characteristics of the sound pressure of the low sound range or the like even more.

Figure 31:
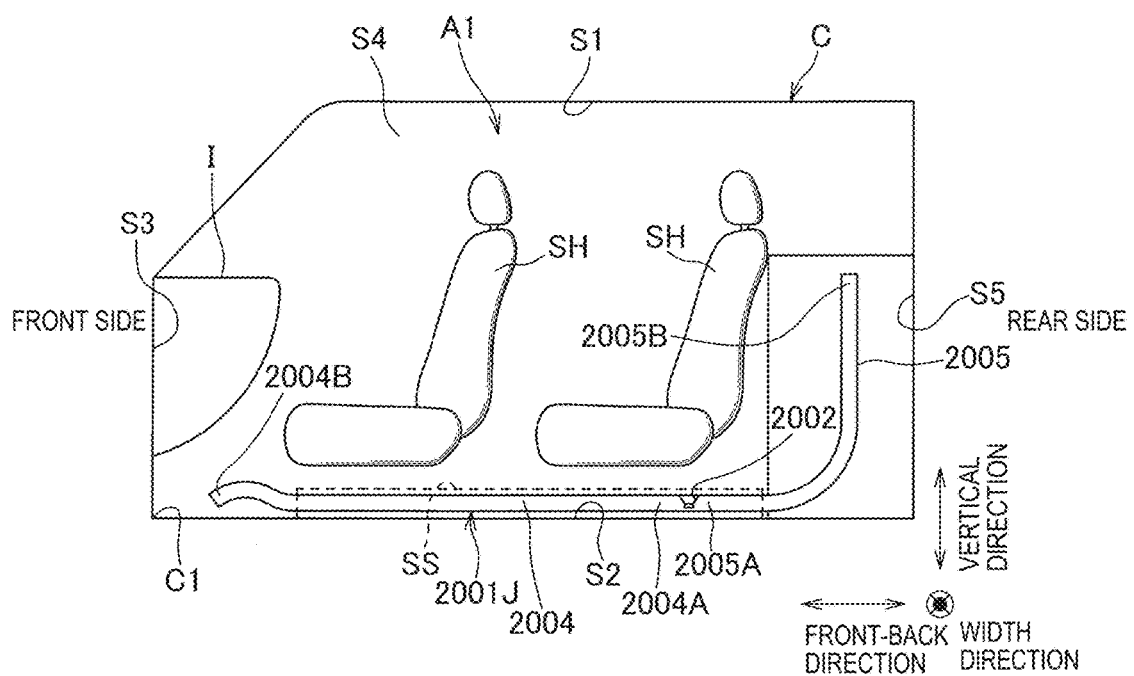
FIG. 31 is a side view illustrating a speaker system for a mobile object according to Modification Example 13 of the present invention.

Further, as illustrated as a modification 13 in FIG. 31, a speaker system for a mobile object 2001J may also be a speaker system such that is formed integrally to form a tubular shape as the modifications 5 and 6, and also a portion of which is accommodated in the side sill SS. The speaker system for the mobile object 2001J may be a speaker system such that the open tubular member 2004, the accommodating unit, and the closed tubular member 2005 are integrated, and at the same time, like the open tubular member 2004 in a modification 12, a portion of which is passing through the inner side of the side sill SS in the side sill SS. Further, as illustrated, in a case where the speaker unit 2002 is provided in the side sill SS, let a hole for guiding sound be formed in the side sill SS in order to make the sound wave emitted from the front surface of the speaker unit 2002 reach the room space of the vehicle A1. Note that the single tubular shaped member in which the open tubular member 2004, the accommodating unit and the closed tubular member 2005 are integrated may form not only the side sill SS, but a body of the vehicle C appropriately, and at the same time, may be provided on the inner side of a component part having a room inside.

According to the speaker system like for the mobile object 2001J like this in a modification 13, since the tubular shaped member in which the open tubular member 2004, the accommodating unit and the closed tubular member 2005 are integrated is provided on the inner side of the component part of the body of the vehicle C such as the side sill SS, it is possible to utilize the free space in the vehicle C effectively. Further, the open tubular member 2004 is wired in the component parts of the body and is drawn out to the room space of the vehicle A1, thereby placing the other end 2004B at a position where the low sound echoes easily, and it becomes possible to let the sound wave be emitted.

The length of the closed tubular member is set approximately half of that of the open tubular member such that the frequency fo of the fundamental vibration in the open tubular member and the frequency fc of the fundamental vibration in the closed tubular member are about the same, and that the maximum value and the minimum value of the synthetic acoustic impedance overlap at the frequency 2 fo (2 fc) as viewed from above in the aforementioned example, but the length of the open tubular member and that of the closed tubular member may be set appropriately. For example, the length of the open tubular member and the length of the closed tubular member may be set in order to make the frequency fo of the fundamental vibration in the open tubular member and the frequency fc of the fundamental vibration in the closed tubular member somewhat different. If the frequency fc of the fundamental vibration in the closed tubular member is 0.75 times larger than, and 1.25 times smaller than the frequency fo in the open tubular member, it is possible to inhibit the sound pressure from decreasing at a specific frequency.

Further, the frequency fo in the open tubular member and the frequency fc of the fundamental vibration in the closed tubular member may be set in order to inhibit a decrease of the sound pressure caused by the other frequency at which the acoustic impedance of the open tubular member becomes maximal. Further, the frequency fo and the frequency fc may be set in order to inhibit an increase of the sound pressure caused by the acoustic impedance of the open tubular member becoming minimum.

Further, as viewed from above in the Example, the other end 2004B of the open tubular member 2004 is opening toward the corner C1 where the front surface S3, the lower surface S2, and the side S4 in the driver's seat side intersect, but, the other end may be opening toward a corner where arbitrary three of the plurality of surfaces surrounding the room space of the vehicle A1 (the inner surface of the windshield W, the upper surface S1, the lower surface S2, the front surface S3, and a pair of the side S4 and the rear surface). Further, the other end of the tubular member may be opening toward an intersecting part where two of the plurality of these surfaces intersect (R1 to R8 illustrated in FIG. 20), may be opening opposed to one surface, or may be along the surface.

Note that the corner C1 is a corner where the front surface S3, the lower surface S2, and the side S4 of the vehicle C intersect, the corner C2 is a corner where the rear surface S5, the lower surface S2, and the side S4, of the vehicle C intersect, and a corner C3 is a corner where the rear surface S5, the upper surface S1, and the side S4 of the vehicle C intersect. Further, an intersection part R1 is an intersection part where the front surface S3, the lower surface S2 of the vehicle C intersect, an intersection part R2 is an intersection part where the lower surface S2 and the side S4 of the vehicle C intersect, an intersection part R3 is an intersection part where the front surface S3 and the side S4 of the vehicle C intersect, an intersection part R4 is an intersection part where the rear surface S5 and the lower surface S2 of the vehicle C intersect, an intersection part R5 is an intersection part where the rear surface S5 and the side S4 of the vehicle C intersect, an intersection part R6 is an intersection part where the front surface S3 and the upper surface S1 of the vehicle C intersect, an intersection part R7 is an intersection part where the upper surface S1 and the side S4 of the vehicle C intersect, and an intersection part R8 is an intersection part where the rear surface S5 and the upper surface S1 of the vehicle C intersect.

Although the best configuration and method for carrying out the present invention have been described above, the invention is not limited to them. That is, the invention is illustrated and described concerning the specific embodiment, but a person skilled in the art can variously modify the above-described embodiment in terms of shapes, materials, the numbers and other detailed configurations. Therefore, the descriptions to limit the above-disclosed shapes and materials are illustratively described to make it easy to understand the present invention, and they do not limit the invention. Thus, descriptions of names of members from which a portion or all of the limitations such as the shapes and the materials are removed are included in the invention.

REFERENCE SIGNS LIST

1A, 1B speaker system for mobile object
2 speaker unit
3 enclosure (accommodating unit)
4 tubular member
41 first door body tubular part (door body tubular part)
42 peripheral edge tubular part
41A first door side opening (door side opening)
42A peripheral edge side opening
4A one end
4B other end
40 front end surface
C1 corner A1 room space of vehicle (space)
C vehicle (mobile object)
DR back door (door body)
D2 rear door (door body)
1001 speaker system for mobile object
1001A to 1010D speaker device
1002A to 1002D speaker unit
1003A to 1003D enclosure (accommodating unit)
1004A to 1004D tubular member
1041 one end
1042 other end
2001 speaker system for mobile object
2002 speaker unit
2003 enclosure (accommodating unit)
2004 open tubular member
2005 closed tubular member
2004A one end
2004B other end
2005A one end
2005B other end

The invention claimed is:

1. A speaker system for a mobile object, comprising:
a speaker unit that emits sound from a front side toward a box-shaped space formed by the mobile object;
an accommodating unit accommodating a back side of the speaker unit; and
a tubular member having one end communicating with an internal space of the accommodating unit,
wherein the speaker unit and the accommodating unit are built into a door body of the mobile object forming a rear surface of the space,
wherein inside the door body, a part of the tubular member extends toward at least one of a plurality of surfaces surrounding the space.

2. The speaker system for the mobile object according to claim 1,
wherein the accommodating unit is located in a position deviated from a central part of a rear surface of the mobile object to one side of the mobile object in a width direction of the mobile object, and
wherein another end of the tubular member opens toward an intersection part where an other side in the width direction of the mobile object and a lower surface of the mobile object intersect.

3. The speaker system for the mobile object according to claim 1,
wherein an other end of the tubular member opens toward an intersection part where at least two of the plurality of surfaces surrounding the space intersect.

4. The speaker system for the mobile object according to claim 1,
wherein said speaker system comprises two speaker devices, each one of said two speaker device constituted by one of each of the speaker unit, the accommodating unit, and the tubular member,
wherein in at least one of the two speaker devices, the speaker unit and the accommodating unit are built into the door body of the mobile object and the portion of the tubular member extends toward at least one of the plurality of the surfaces surrounding the space inside the door body, and
wherein the two speaker devices are placed in the box-shaped space at respective corners of a front side and a rear side of the mobile object in the travelling direction.

5. The speaker system for the mobile object according to claim 1, further comprising:

at least one closed tubular member with a first end connected to the inner space of the accommodating unit and a second end that is closed.

6. The speaker system for the mobile object according to claim 5,
wherein the tubular member is longer than the closed tubular member.

7. The speaker system for the mobile object according to claim 6,
wherein lengths of the tubular member and the closed tubular member are such that a frequency of fundamental vibration in the closed tubular member is 0.75 times greater than, and 1.25 times less than that of a fundamental vibration of the tubular member.

8. The speaker system for the mobile object according to claim 6,
wherein lengths of the tubular member and the closed tubular member are such that a first frequency of a fundamental vibration of the tubular member and a second frequency of the fundamental vibration of the closed tubular member become equal.

9. A mobile object comprising the speaker system according to claim 1.

\* \* \* \* \*